(12) United States Patent
Parez et al.

(10) Patent No.: US 12,542,454 B2
(45) Date of Patent: Feb. 3, 2026

(54) DEVICE AND METHOD FOR EFFICIENT ENERGY HARVESTING

(71) Applicant: E-PEAS, Ottignies-Louvain-la-Neuve (BE)

(72) Inventors: Robin Parez, Ottignies-Louvain-la-Neuve (BE); Geoffroy Gosset, Ottignies-Louvain-la-Neuve (BE); Julien De Vos, Ottignies-Louvain-la-Neuve (BE)

(73) Assignee: E-PEAS, Ottignies-Louvain-la-Neuve (BE)

( * ) Notice: Subject to any disclaimer, the term of this patent is extended or adjusted under 35 U.S.C. 154(b) by 176 days.

(21) Appl. No.: 18/520,737

(22) Filed: Nov. 28, 2023

(65) Prior Publication Data

US 2024/0097563 A1    Mar. 21, 2024

Related U.S. Application Data

(63) Continuation-in-part of application No. PCT/EP2022/064863, filed on Jun. 1, 2022.

(30) Foreign Application Priority Data

Jun. 1, 2021 (EP) .................................... 21177065

(51) Int. Cl.
*H02J 50/00* (2016.01)
*G05F 1/67* (2006.01)

(52) U.S. Cl.
CPC .............. *H02J 50/001* (2020.01); *G05F 1/67* (2013.01); *H02J 2300/26* (2020.01)

(58) Field of Classification Search
CPC ........ H02J 50/001; H02J 2300/26; G05F 1/67
See application file for complete search history.

(56) References Cited

U.S. PATENT DOCUMENTS 9,991,712 B1    6/2018 Huang et al.
2017/0117818 A1*  4/2017 Shao ..................... H02J 50/001
(Continued)

FOREIGN PATENT DOCUMENTS

| CN | 109885123 A | 6/2019 |
| EP | 3474407 A1 | 4/2019 |
| EP | 3500904 A1 | 6/2019 |

OTHER PUBLICATIONS

Int'l Search Report for PCT/EP2022/064863, dated Sep. 12, 2022.

*Primary Examiner* — Harry R Behm
(74) *Attorney, Agent, or Firm* — MaxGoLaw PLLC

(57) ABSTRACT

A power management device is provided that includes a voltage converter, a power point tracker for determining an operational voltage for extracting power and a controller. The device has a sensing device configured for: monitoring an energy harvesting signal, comparing the energy harvesting signal with a first threshold value, and based on the values sometimes generating a trigger signal. The controller performs energy harvesting until a trigger signal is generated by cyclically operating the power point tracker for determining a first and second target voltages performing energy harvesting conditionally based on sensing device signals else operating the voltage converter. The sensing device has a signal output of the first trigger signal and the signal output is electrically connected with a signal input of the power point tracker. The power point tracker is configured for starting a determination of the second target voltage when receiving the first trigger signal.

20 Claims, 16 Drawing Sheets

(56) References Cited

U.S. PATENT DOCUMENTS

| | | | |
|---|---|---|---|
| 2020/0233443 A1* | 7/2020 | De Vos | H02J 50/001 |
| 2020/0321910 A1* | 10/2020 | De Vos | H02J 50/001 |
| 2020/0321948 A1* | 10/2020 | Bose | H02M 3/155 |
| 2020/0387182 A1* | 12/2020 | De Vos | G05F 1/46 |
| 2021/0135490 A1 | 5/2021 | Relevant et al. | |

* cited by examiner

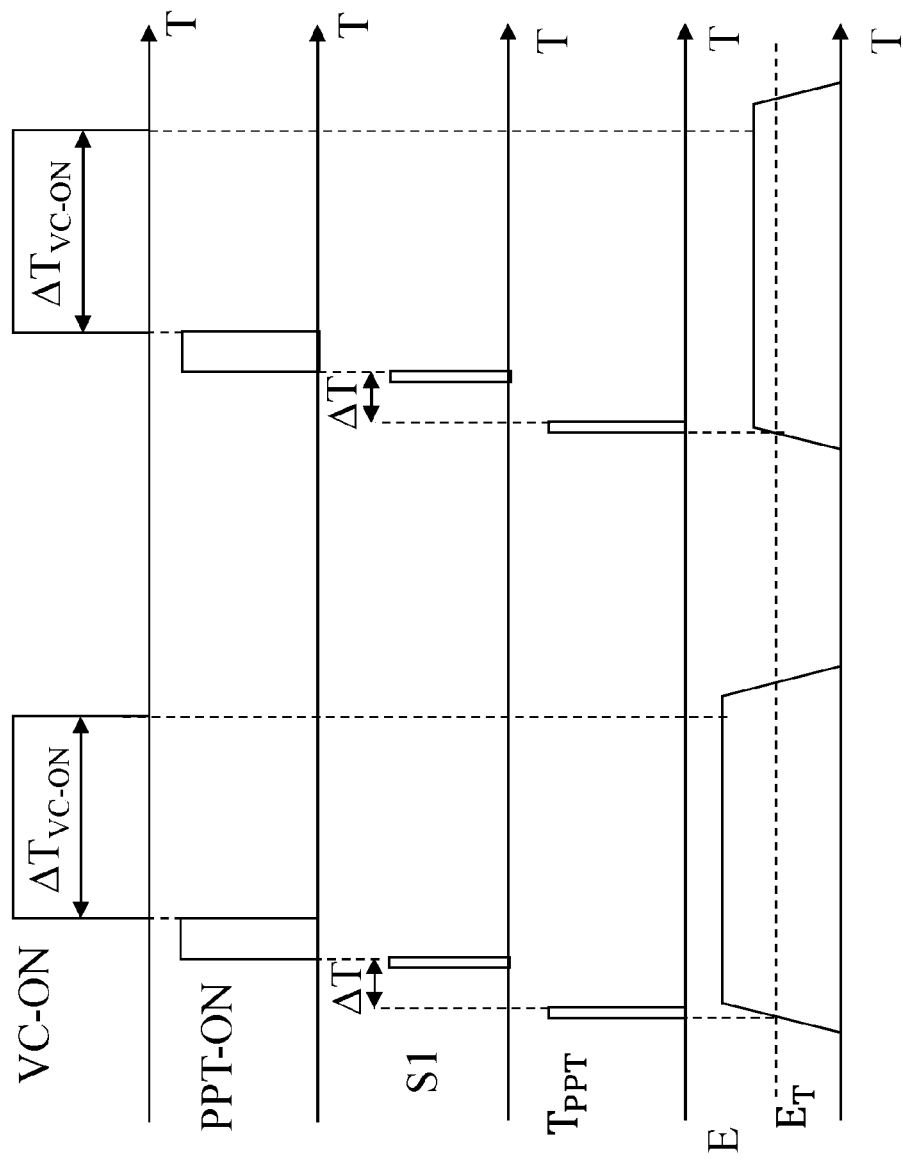

DEVICE AND METHOD FOR EFFICIENT ENERGY HARVESTING

RELATED APPLICATIONS

This application is a continuation-in-part of International Application No. PCT/EP2022/064863, filed 1 Jun. 2022, which in turn claims priority benefit EP21177065.6, filed 1 Jun. 2021, the contents of the aforementioned priority documents are hereby incorporated by reference.

FIELD OF THE INVENTION

The invention relates to power management device for managing energy received from an energy source, more specifically an power management device comprising a voltage converter and a power point tracker configured for determining an optimum operational voltage for extracting power from the energy source.

DESCRIPTION OF PRIOR ART

The use of power management devices comprising a voltage converter for extracting energy from an energy source is well known in the art (see for example EP-A1-3474407). The extracted energy can be used for charging a rechargeable energy storage device and/or powering an application load. The application load can be any type of application such as for example portable devices, sensors, external circuits, wireless transmitters.

The power management device for managing energy is generally implemented as an integrated circuit and is also named power management integrated circuit (PMIC). An example of a PMIC available from the applicant of the current patent application is known under reference number AEM10941.

A variety of energy sources can be used to harvest energy such as for example photovoltaic cells (PV), thermoelectric generators (TEG), piezoelectric energy generators and electromagnetic energy sources.

Generally, to efficiently extract power from an energy source, the input voltage of the voltage converter is regulated. Either, the input voltage is regulated to a predefined reference voltage value, or alternatively, the PMIC comprises a power point tracker (PPT) for determining an optimum operational voltage based on for example sensing an open-circuit voltage. Generally, the optimum operational voltage is a voltage defined for extracting maximum power from the energy source and hence the PPT is generally also named maximum power point tracker (MPPT).

When the voltage converter is operational and extracts energy from the energy source, the voltage converter regulates its input voltage to be equal to the optimum operational voltage determined either through the pre-defined reference value or determined with the PPT.

A disadvantage of using a predefined reference value as optimum operational voltage is that the predefined reference value is a fixed value and hence does not necessarily correspond to the actual energy source configuration. Further, the optimum operational voltage, for example for extracting maximum power from the energy source, can vary over time.

An advantage of using a PMIC with a power point tracker is that the optimum voltage can be determined periodically, for example every tens of milliseconds to seconds. In embodiments, the PMIC typically comprises a clock generator configured for cyclically triggering the operation of the PPT during discrete time intervals so as to cyclically determining the optimum operational voltage.

Generally, during operation of the PPT, the voltage converter is not operational. In other words, the voltage converter and the power point tracker are operational in a mutually exclusive way, i.e. either the voltage converter is operational or the PPT s operational but not both at the same time.

An example of a method applied by the PPT for determining the optimum operational voltage is based on a measurement of an open circuit voltage of the energy source and wherein a ratio of the measured open circuit voltage is defined as the optimum operational voltage.

However, one of the problems with the present PMIC's is that they are less suited for situations wherein the PMIC receives energy from intermittent energy sources such as for example energy sources that behave as ON-OFF sources. These type of intermittent energy sources provide a large amount of energy, e.g. an energy in a range from tens of milliwatts to watts, in a short period of time, e.g. a time period in a range from hundreds of milliseconds to seconds.

An example of a source that behaves as an ON-OFF source is an RF emitter or light emitter of a card reader for reading an access card. As the access card is receiving energy from the card reader only when the access card is put above the card reader, the access card observes the energy source as an ON-OFF source. Another example would be a piezo embedded within a tire that provides energy only when close to the ground as the wheel rotates.

As the PPT is only triggered cyclically, energy is wasted as long as the PPT has not been triggered.

A further drawback with intermittent energy sources and present PMIC's is that there is delay before the PMIC can start efficiently operating, which can be a serious problem for cases wherein the time period energy is available is short and/or for applications wherein a fast reaction is required such as is the case for example with access cards.

Hence, there is room for improving power management devices for energy harvesting.

SUMMARY OF THE INVENTION

It is an object of the present invention to provide a power management device for managing energy received from an energy source in an efficient way without the drawbacks of the prior art power management devices that are not suited for intermittent energy sources, as discussed above.

The present invention is defined in the appended independent claims. The dependent claims define advantageous embodiments.

According to a first aspect of the invention, a power management device for managing energy from an energy source is provided.

The power management device comprises a voltage converter configured for regulating an input voltage of the voltage converter at a target voltage, a power point tracker configured for determining the target voltage as an optimum operational voltage for extracting power from the energy source, and a controller for controlling operation of the voltage converter and the power point tracker. The power management device further comprises a sensing device configured for i) monitoring an energy harvesting signal, and wherein the energy harvesting signal is indicative of harvestable power from an energy source, ii) comparing the energy harvesting signal with a first threshold value, and iii)

if the energy harvesting signal has increased from a value below to a value above the first threshold value then generating a first trigger signal.

The controller of the power management device according to the present disclosure is configured performing first energy harvesting as long as the sensing device has not generated the first trigger signal, and wherein performing first energy harvesting comprises: a) cyclically operating the power point tracker for determining a first target voltage, and b) operating and regulating the voltage converter at the first target voltage.

The controller is further configured for switching from performing first energy harvesting to performing second energy harvesting if the sensing device is generating the first trigger signal, and wherein performing second energy harvesting comprises: a) operating the power point tracker and determining a second target voltage in response to the generation of the first trigger signal by the sensing device, and b) operating and regulating the voltage converter at the second target voltage if the power point tracker has completed determining the second target voltage.

In addition, the sensing device comprises a signal output for outputting said first trigger signal and the signal output of the sensing device is electrically connected with a signal input of said power point tracker, and the power point tracker is configured for starting a first determination of said second target voltage when receiving said first trigger signal.

Advantageously, by using a sensing device for sensing an energy harvesting signal and triggering the power point tracker to start operate and determine a target voltage when power, e.g. power from an intermittent energy source, is rising above a threshold value, the voltage converter will immediately start operating at the optimum input voltage for efficiently extracting power from the energy source. Hence, there is no time period of extracting energy in a non-efficient way, as is the case with prior art power management devices.

Advantageously by using the sensing device for triggering the power point tracker if the power rises above a threshold value, the power point tracking cycle is synchronized with the energy supply cycle of for example an intermittent energy source.

In embodiments, the controller is configured for receiving the trigger signal from the sensing device and for subsequentially generating a first start signal for the power point tracker and wherein the power point tracker is configured for receiving the first start signal and for starting a first determination of the target voltage when receiving the first start signal.

In embodiments, performing the second energy harvesting further comprises: after having performed the determination of the second target voltage for a first time in response to the generation of the first trigger signal by the sensing device, cyclically operating the power point tracker for cyclically repeating the determination of the second target voltage.

In embodiments, the controller is configured for operating the power management device in an energy harvesting mode and in a sleep mode of reduced power consumption, and wherein the first and the second energy harvesting is performed when in the energy harvesting mode. The controller is further configured for generating a sleep signal for switching the power management device from the energy harvesting mode to the sleep mode of reduced power consumption if the energy harvesting signal has dropped from a value above to a value below a third threshold value, and wherein the third threshold value is lower than the first threshold value.

In embodiments, the power point tracker is configured for starting determining the target voltage within less than 250 milliseconds, preferably within less than 10 milliseconds, more preferably within less than 1 milliseconds, following the generation of the trigger signal by the sensing device. In other words, in view of this fast response time in the milliseconds range of the power point tracker to the trigger signal, one can consider that the response of the power point tracker to the trigger signal is essentially instantaneous.

In embodiments, the controller of the power management device is configured for delaying, by a delay time period, the determination of the second target voltage in response to the generation of the first trigger signal.

In embodiments, the power management device according to the present disclosure is further configured for receiving an external trigger signal, and wherein the controller is further configured for starting performing second energy harvesting if the external trigger signal has been received.

The present disclosure also related to a system comprising the power management device as claimed in claim 1, an energy source coupled to a power input terminal of the power management device and a rechargeable storage device or a load coupled to a power output terminal of the power management device. The energy source is for example an intermittent energy source.

According to a second aspect of the invention, a method is provided for managing energy from an energy source using a power management device comprising i) a voltage converter configured for regulating an input voltage at a target voltage and ii) a power point tracker configured for determining the target voltage as an optimum operational voltage for extracting power from the energy source.

The method according to the present disclosure comprises: monitoring an energy harvesting signal that is indicative of harvestable power from the energy source, comparing the energy harvesting signal with a first threshold value, generating a first trigger signal if the energy harvesting signal has increased from a value below to a value above the first threshold value. The method further comprises: as long as the first trigger signal is not generated performing first energy harvesting, wherein the first energy harvesting comprises: a) cyclically operating the power point tracker for determining a first target voltage, and b) operating and regulating the voltage converter at the first target voltage, and if the first trigger signal is generated then switching from performing first energy harvesting to performing second energy harvesting, wherein the second energy harvesting comprises: a) starting operating the power point tracker and determining a second target voltage with the power point tracker in response to the generation of the first trigger signal, and b) starting operating and regulating the voltage converter at the second target voltage if the power point tracker has completed determining the second target voltage. The switching from performing said second energy harvesting to performing said first energy harvesting if said second trigger signal has been generated is executed only at a moment in time when the power point tracker is operational for target voltage determination.

In embodiments, the power management device is configured for operating the power point tracker and operating the voltage converter in a mutually exclusive way.

BRIEF DESCRIPTION OF THE DRAWINGS

These and further aspects of the invention will be explained in greater detail by way of example and with reference to the accompanying drawings in which.

The drawings of the figures are neither drawn to scale nor proportioned. Generally, identical components are denoted by the same reference numerals in the figures.

DETAILED DESCRIPTION OF EMBODIMENTS OF THE INVENTION

Figure 1:
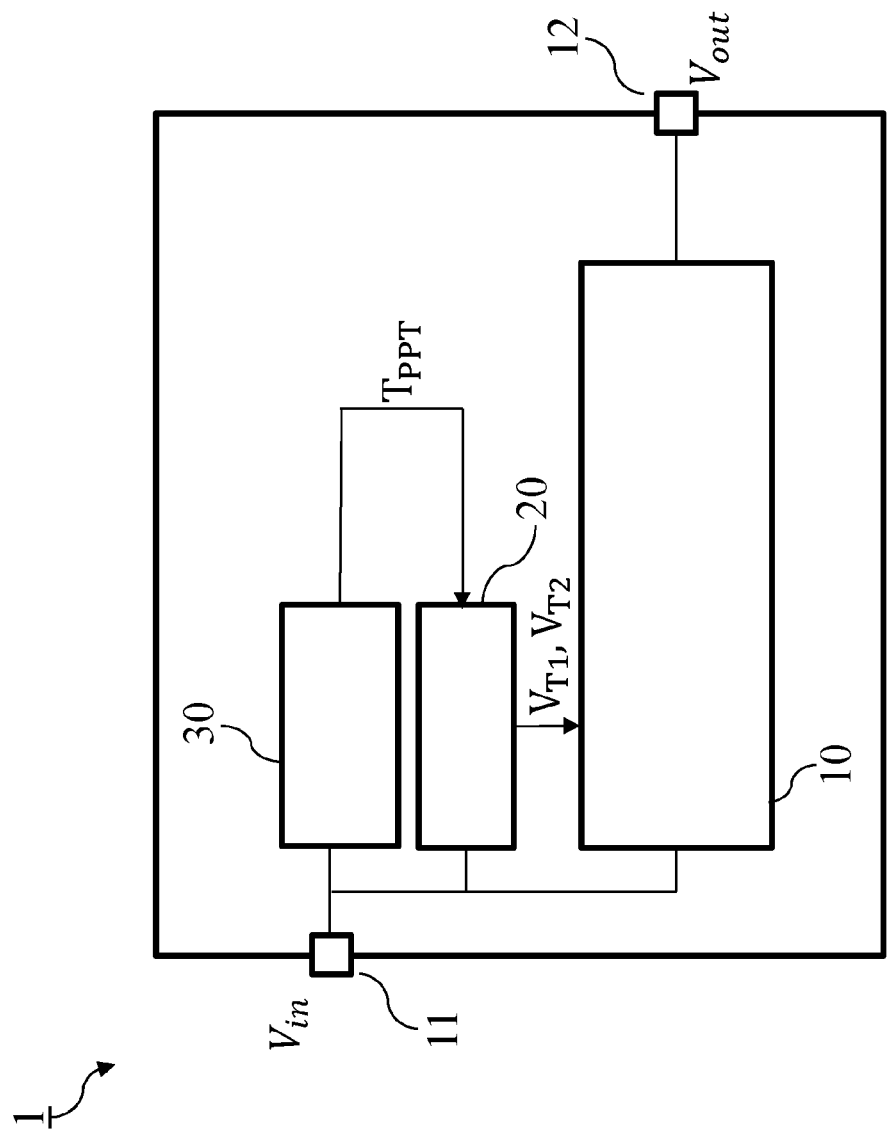
FIG. 1 is a block diagram schematically illustrating a first embodiment of a power management device according to the present disclosure.

The present disclosure will be described in terms of specific embodiments, which are illustrative of the disclosure and not to be construed as limiting. It will be appreciated by persons skilled in the art that the present disclosure is not limited by what has been particularly shown and/or described and that alternatives or modified embodiments could be developed in the light of the overall teaching of this disclosure. The drawings described are only schematic and are non-limiting.

Use of the verb "to comprise", as well as the respective conjugations, does not exclude the presence of elements other than those stated. Use of the article "a", "an" or "the" preceding an element does not exclude the presence of a plurality of such elements.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Reference throughout this specification to "one embodiment" or "an embodiment" means that a particular feature, structure or characteristic described in connection with the embodiments is included in one or more embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one ordinary skill in the art from this disclosure, in one or more embodiments.

The use of the term "controller" has to be construed in the broadest sense as being an electronic digital circuit generally comprising combinatory logic.

Power Management Device, General

Examples of embodiments of a power management device according to the present disclosure are schematically shown on FIG. 1, FIG. 2, FIG. 5, FIG. 6 and FIG. 10.

The power management device 1 for managing energy from an energy source comprises a voltage converter 10 configured for converting an input voltage $V_{in}$ into an output voltage $V_{OUT}$. During energy harvesting, the voltage converter 10 regulates the input voltage at a target voltage $V_T$. The target voltage $V_T$ is an optimum voltage for extraction for example maximum power from the energy source.

The regulation of the input voltage $V_{in}$ at the target voltage by the voltage converter has to be construed as continuously comparing the input voltage $V_{in}$ with the target voltage $V_T$ and reducing the input voltage when the input voltage is above the target voltage and allowing increasing the input voltage when the input voltage is below the target voltage.

In embodiments, the voltage converter 10 is a DC-DC voltage converter. The voltage converter comprises for example a boost converter circuit for increasing the input voltage $V_{in}$, a buck converter circuit for decreasing the input voltage Vin or a buck-boost converter circuit for both decreasing and increasing the input voltage. These DC-DC voltage converter circuits are known in the art.

The power management device further comprises a power point tracker PPT 20 configured for determining the target voltage $V_T$ as an optimum operational voltage for extracting power from the energy source. Examples of embodiments of power point trackers are further discussed below.

Generally, the power management device is configured for operating the voltage converter and the power point tracker in a mutually exclusive way, i.e. when the power point tracker is operational for determining the target voltage, the voltage converter is not operational, and vice versa. Hence, in these embodiments, no energy can be harvested during the operation of the power point tracker. This is schematically illustrated in for example FIG. 3a and FIG. 4, wherein the two top panels represent examples of a time diagram indicating some ON periods, PPT-ON, of the power point tracker and some ON periods, VC-ON, of the voltage converter. The time period the power point tracker is ON is also named sampling period and the time the voltage converter is ON is also named regulating period or energy harvesting period.

A controller 40 is configured for controlling operation of the voltage converter 10 and operation of the power point tracker 20.

The power management device according to the present disclosure comprises a sensing device 30 configured for i) monitoring an energy harvesting signal, ii) comparing the energy harvesting signal with a first threshold value, and ii) if the energy harvesting signal has increased from a value below to a value above the first threshold value then generating a first trigger signal $T_{PPT}$. The energy harvesting signal is a signal indicative of a presence of energy harvestable power from an energy source.

Harvestable power can become available from different types of energy sources and the harvestable energy can vary in time. For example, an ON/OFF source can switch to ON and thereby increase the harvestable power. Another example is an energy source that emits power in a given direction and when directed towards the power management device, the harvestable power by the power management device increases.

The power management device according to the present disclosure is characterized in that the power point tracker 20 is configured for starting determining the target voltage $V_T$ in response to the generation of the first trigger signal by the sensing device. In other words, the sensing device 30 triggers the operation of the power point tracker 20 if the power detected is above a first threshold. This is in contrast with prior art power management power management devices that do not comprise such a sensing device 30 that triggers the power point tracker to start operating. Instead, the prior art power management devices typically make use of a clock generator configured for cyclically triggering the operation of the PPT 20 during discrete time intervals so as to cyclically determining the optimum operational voltage.

In embodiments, the starting of the determination of the target voltage $V_T$ with the power point tracker 20 is performed within less than 250 ms, preferably within less than 10 ms, more preferably within less than 1 ms, following the generation of the first trigger signal $T_{PPT}$ by the sensing device 30.

Figure 3A:
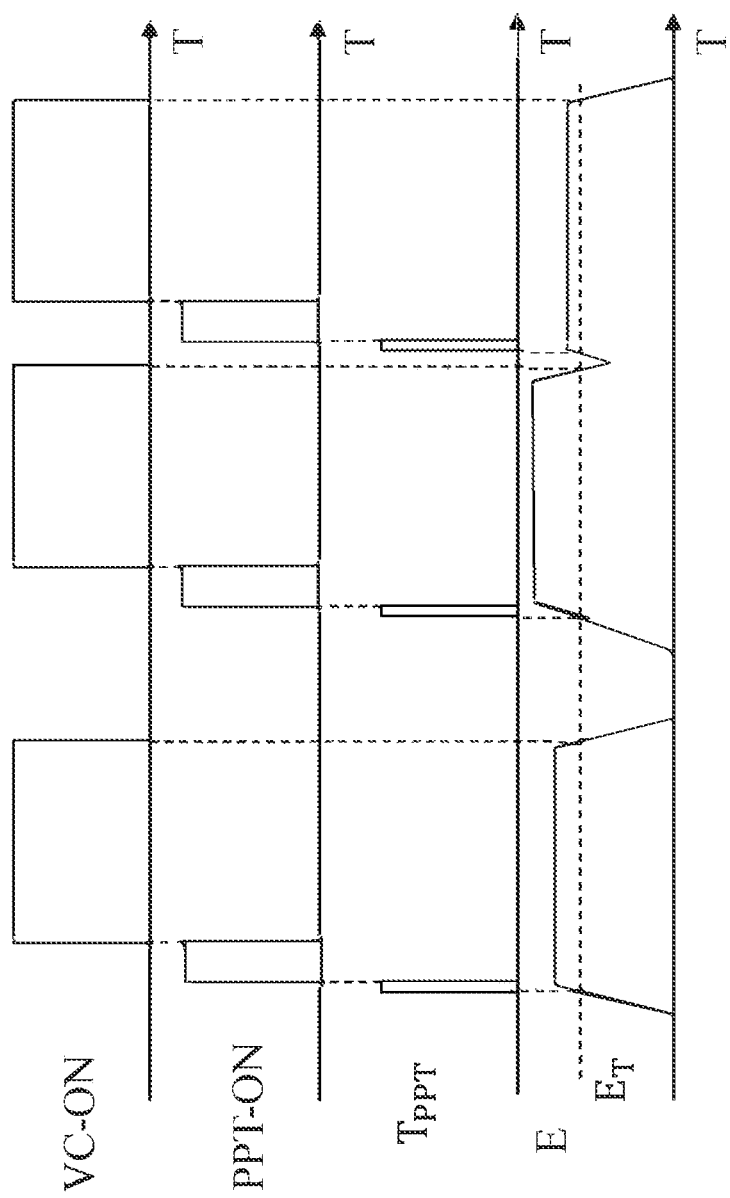

The generation of the first trigger signal and the operation of the power point tracker and voltage converter are schematically illustrated on FIG. 3a with some time diagrams. The bottom panel schematically illustrates an example of an energy harvesting signal E of for example an ON/OFF type of energy source. As illustrated on the two lower panels of FIG. 3a, when the sensing device detects that the energy harvesting signal E has increased from a value below to a value above a first threshold $E_T$, the first trigger signal $T_{PPT}$ is generated. As a response to the generation of the first trigger signal $T_{PPT}$, the power point tracker is triggered and is set ON and starts determining the target voltage for operating the voltage converter. As illustrated on FIG. 3a, when the determination of the target voltage is completed, the power point tracker is set OFF and the voltage converter is set ON for harvesting energy while regulating the input voltage at the target voltage determined with the power point tracker.

The power management device of the present disclosure can also harvest energy even if the first trigger signal $T_{PPT}$ has not been triggered yet. Indeed the first trigger signal is only generated if the available harvestable power is above a first threshold value, which does not mean that no harvestable power is available when below the first threshold value.

The controller is configured for operating the power management device to perform first EH-1 and second EH-2 energy harvesting. The second energy harvesting EH-2 is defined as energy harvesting performed if the energy harvesting signal has raised above the first threshold value, while first energy harvesting EH-1 is defined as energy harvesting performed if the energy harvesting signal has dropped below the first threshold value.

Figure 3B:
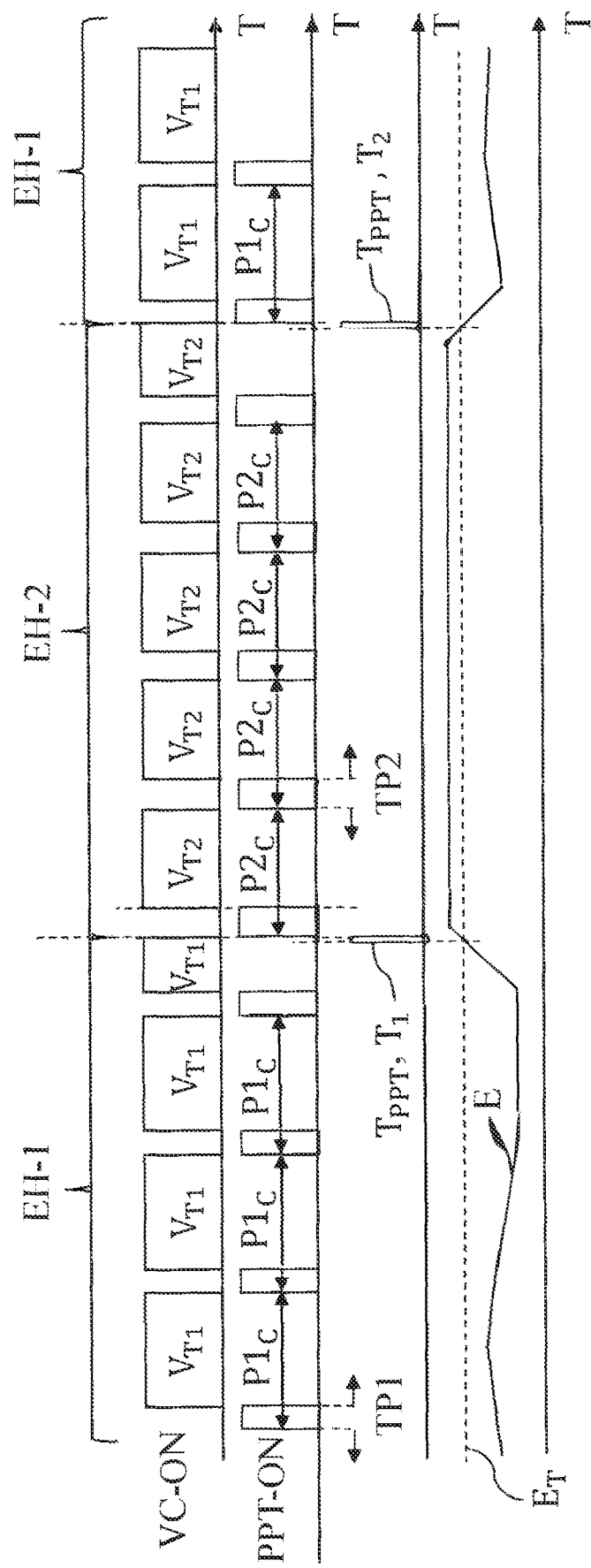

Performing first EH-1 and second EH-2 energy harvesting is for example schematically illustrated on FIG. 3b. The bottom panel illustrates an example of an energy harvesting signal E that is varying as function of time. As discussed above, the sensing device triggers a first trigger signal $T_{PPT}$, T1 if the energy harvesting signal E increases from a value below to a value above a first threshold value $E_{T1}$. As illustrated on FIG. 3b, as long as the sensing device has not generated the first trigger signal $T_1$ the controller performs first energy harvesting EH-1 comprising cyclically operating the power point tracker 20 for determining a first target voltage $V_{T1}$, and operating and regulating the voltage converter 10 at the first target voltage $V_{T1}$. In this example, the cyclic operation of the power point tracker for determining the first target voltage is performed every first period P1c. On the other hand, if the sensing device is generating the first trigger signal $T_1$ then the controller switches from performing first energy harvesting EH-1 to performing second energy harvesting EH-2, wherein the second energy harvesting comprises: starting operating the power point tracker 20 and determining a second target voltage $V_{T2}$ in response to the generation of the first trigger signal $T_1$ by the sensing device 30, and starting operating and regulating the voltage converter at the second target voltage $V_{T2}$ if the power point tracker has completed determining the second target voltage $V_{T2}$.

In embodiments, as schematically illustrated on FIG. 3b, performing second energy harvesting EH-2 further comprises: after having performed the determination of the second target voltage $V_{T2}$ for a first time in response to the generation of the first trigger signal $T_1$ by the sensing device 30, cyclically operating the power point tracker 20 for cyclically repeating the determination of the second target voltage $V_{T2}$. In this example, as schematically illustrated on FIG. 3b, the cyclic repeating of the determination of the second target voltage is performed every second period $P2_C$.

In embodiments, the cyclic operating the power point tracker 20 for determining the first target voltage $V_{T1}$ is repeated at a first frequency and the cyclic operating of the power point tracker 20 for determining the second target voltage $V_{T2}$ is repeated at a second frequency, wherein: F1>F2, or F1<F2 or F1=F2, with F1 and F2 being respectively the first and second frequency. The cyclic frequency is the inverse of the cyclic period shown on FIG. 3b, hence F1=1/P1$_C$ and F2=1/P2$_C$, with P1$_C$ and P2$_C$ being respectively the first and the second time period for cyclically repeating the determination of the first and second target voltage.

As further schematically illustrated on FIG. 3b, the determination of the first target voltage $V_{T1}$ and the determination of the second target voltage $V_{T2}$ is performed during respectively a first tracking time period TP1 and a second tracking time period TP2. In embodiments, the first tracking time period TP1 is different from the second tracking time period TP2. In other embodiments, the first tracking time period TP1 is equal to the second tracking time period TP2.

For switching from second energy harvesting EH-2 back to first energy harvesting EH-1, various options are possible, as will be discussed below.

In embodiments, as further illustrated on FIG. 3b and FIG. 3d, the sensing device 30 is configured for generating a second trigger signal $T_2$ if the energy harvesting signal E has dropped from a value above the first threshold value $E_{T1}$ to a value below a second threshold value $E_{T2}$, and wherein the second threshold value is equal or lower than the first threshold value. The controller 40 is further configured for switching from performing the second energy harvesting to performing the first energy harvesting if the sensing device has generated the second trigger signal $T_2$. In the embodiment shown on FIG. 3b, the second threshold value is equal to the first threshold value, while for the embodiment shown on FIG. 3d, the second threshold value $E_{T2}$ is lower than the first threshold value $E_{T1}$.

In embodiments, as illustrated on FIG. 3b, when the second trigger signal $T_2$ has been generated, the controller immediately stops operating the voltage converter in response to this second trigger signal and switches from performing second energy harvesting to performing first energy harvesting by for instance starting operating the power point tracker for performing a new target voltage determination.

In other embodiments, the switching from performing first energy harvesting to performing second energy harvesting is only performed at a moment in time when the power point tracker is operational for target voltage determination, for instance when a new cyclic target voltage determination has started or is ongoing. Hence, in these embodiments, if the second trigger signal $T_2$ has been generated, the controller is configured for executing the switching from the second to the first energy harvesting only at a moment in time when the power point tracker is operational for target voltage determination. In other words, in these embodiments, there are two conditions for switching from the second to the first energy harvesting: the power point tracker is operational and the second trigger signal has been generated.

In further embodiments, performing second energy harvesting EH-2 further comprises comparing each second target voltage $V_{T2}$ determined with a target threshold value. In these embodiments, the controller 40 is further configured for switching from performing the second energy harvesting EH-2 to performing the energy harvesting EH-1 if during operation of the power tracker the second target voltage determined is below the target threshold value. Hence, in these embodiments switching from the second to the first energy harvesting is only performed at a moment in time when the power point tracker is operational for target voltage determination. The target threshold value can be a pre-defined value, specifying the voltage condition to switch back from the second the first energy harvesting.

For embodiments wherein the switching from second to first energy harvesting is performed at a moment in time when the power point tracker is operational for target voltage determination, the target voltage determination performed by the power point tracker in between operating the voltage converter during second energy harvesting and again operating the voltage converter during first energy harvesting, is performed only once.

Figure 3C:
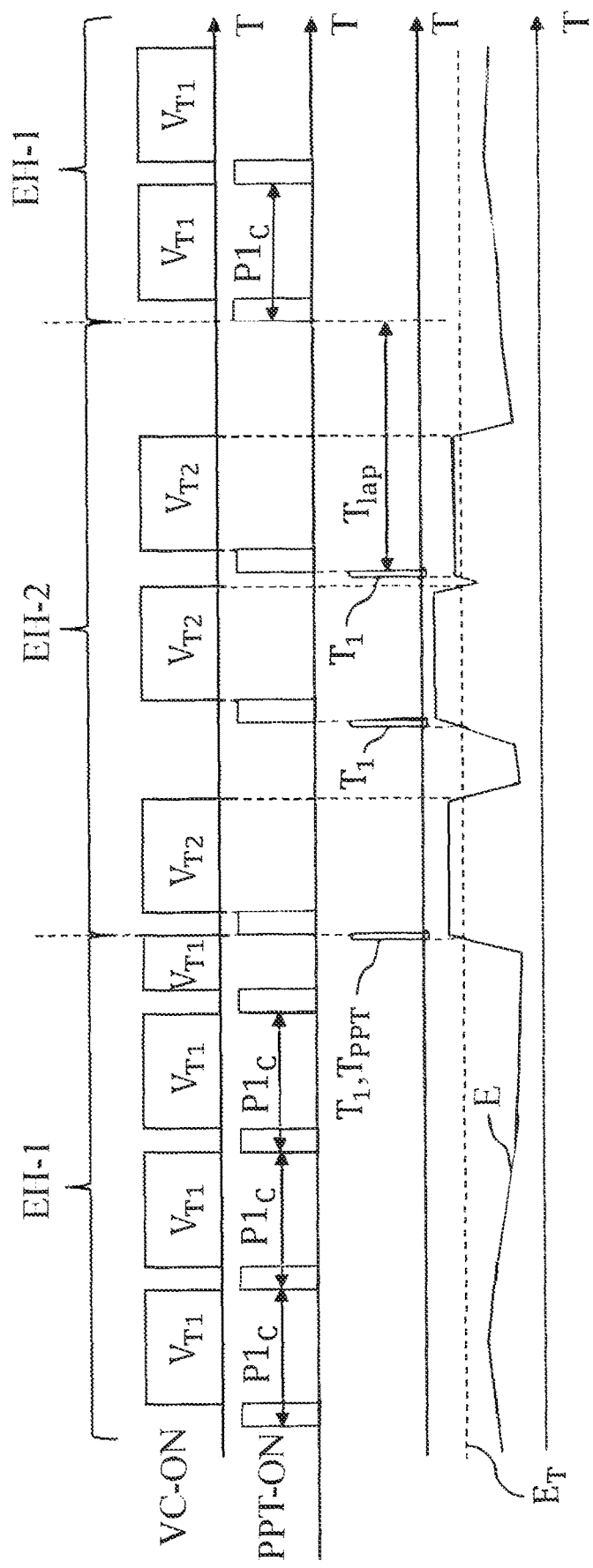
Figure 3D:
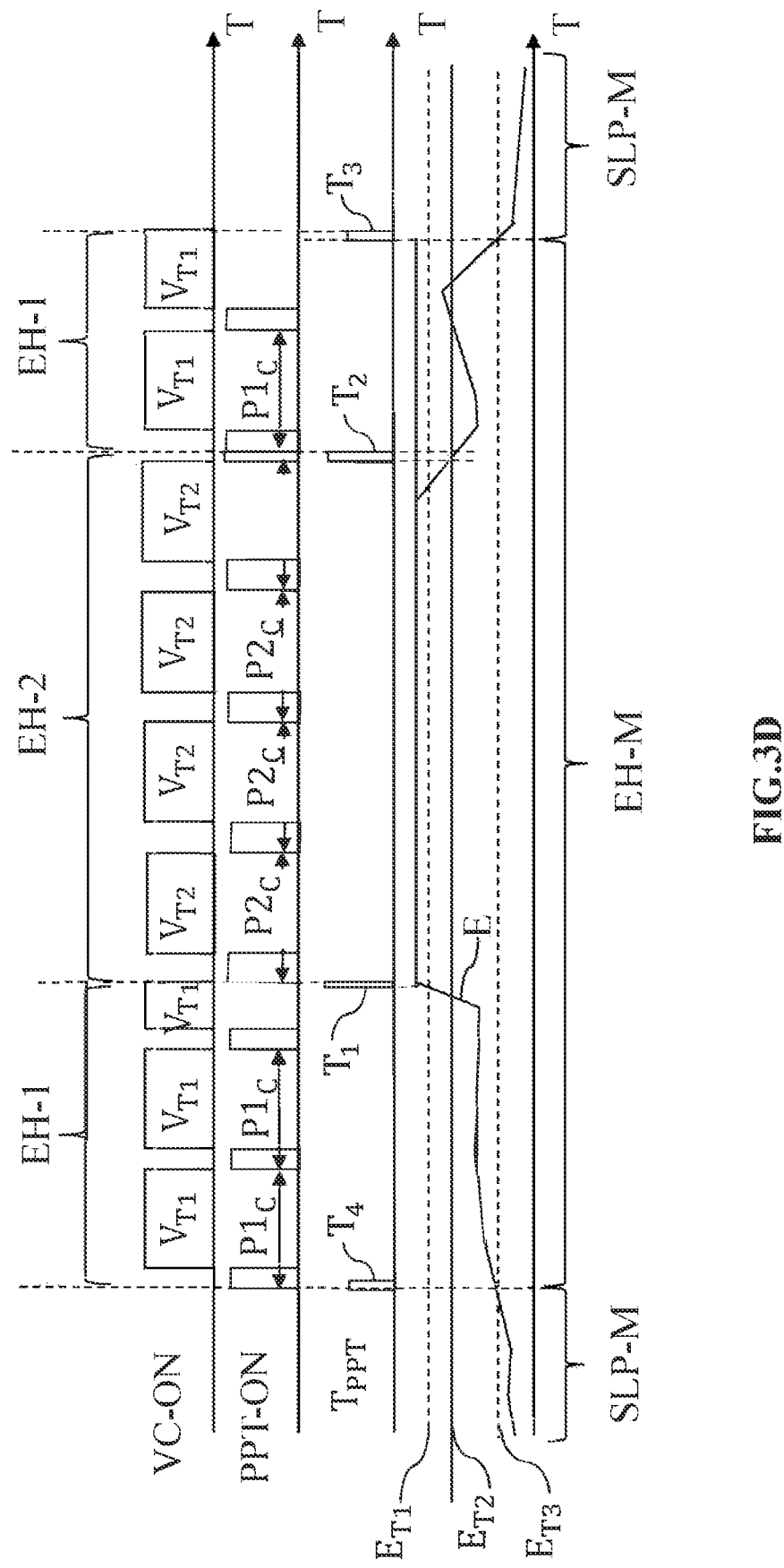
Figure 3E:
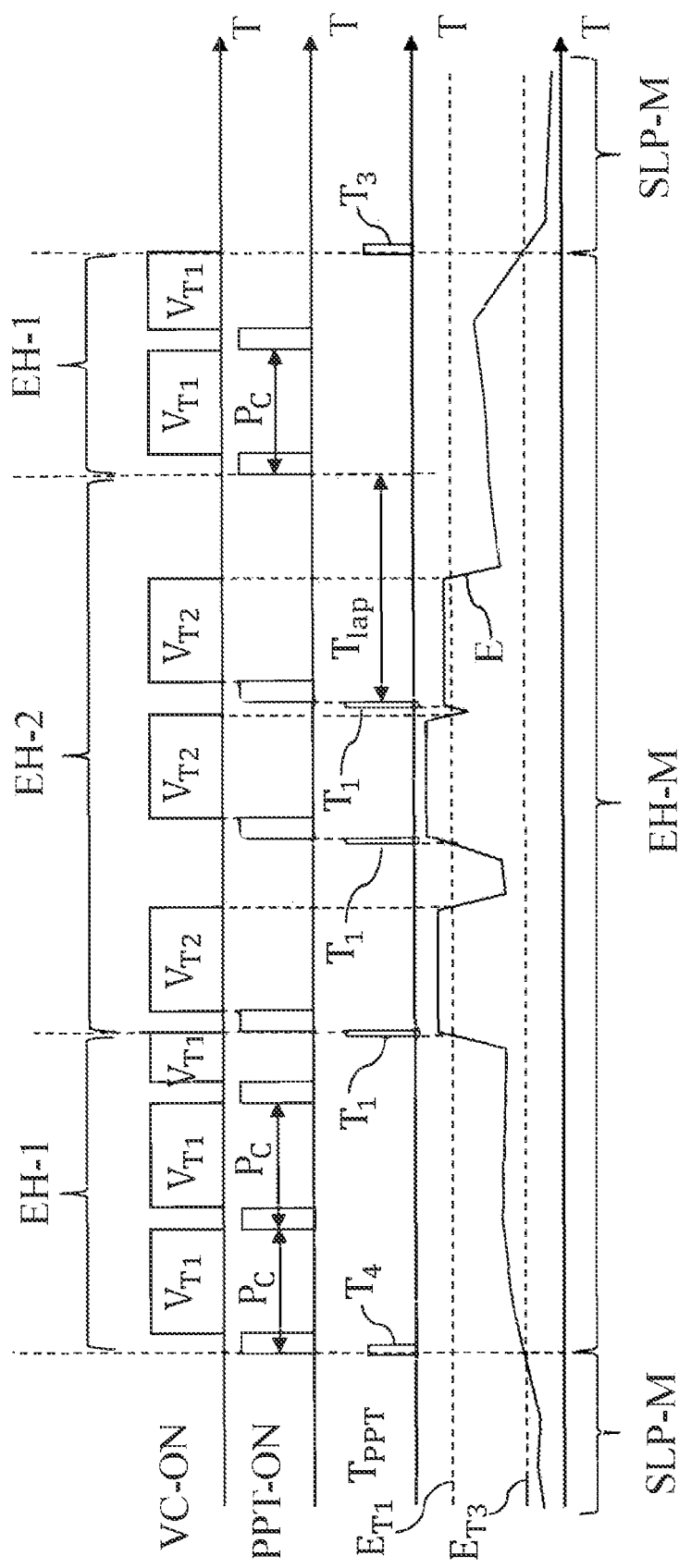

In other embodiments, when performing second energy harvesting EH-2, as schematically illustrated on FIG. 3c and FIG. 3e, the controller 40 is configured for switching from performing second energy harvesting EH-2 to performing the first energy harvesting EH-1 if following a first generation of the first trigger signal $T_1$ a pre-defined time period $T_{lap}$ has elapsed without a second generation of the first trigger signal $T_1$.

In some embodiments wherein switching from the second EH-2 to first EH-1 energy harvesting is based on elapsing of a pre-defined time period $T_{lap}$, as illustrated on FIG. 3c and FIG. 3e, the determination of the second target value $V_{T2}$ with the power point tracker is repeated each time the energy harvesting signal E is increasing from a value below to a value above the first threshold value $E_{T1}$. In the examples of FIG. 3c and FIG. 3e, the first trigger signal $T_1$ is shown to have been triggered three times.

In an embodiment as schematically illustrated on FIG. 1, the sensing device 30 comprises a signal output for outputting the trigger signal $T_{PPT}$ and this signal output of the sensing device 30 is electrically connected with a signal input of the power point tracker 20. Hence in this embodiment, the PPT directly receives the trigger signal from the sensing device.

In other embodiments, the trigger signal from the sensing device is first sent to the controller 40 and the controller then subsequently triggers the power point tracker 20. For example, in the embodiment as illustrated on FIG. 2, the controller 40 is configured for receiving the trigger signal $T_{PPT}$ generated by the sensing device 30.

In embodiments, the controller 40 is configured for generating a first start signal S1 for the power point tracker if the first trigger signal $T_1$ is generated. The power point tracker comprises an input for receiving this first start signal S1 and the power point tracker 20 is further configured for starting a first determination of the target voltage when receiving the first start signal S1.

The controller 40 for controlling the power point tracker and controlling the voltage converter as discussed above, can be a dedicated controller or the controller can be part of or be a main controller 60 of the power management device. In embodiments, a sub-controller 40a, part of the controller 40, is configured for receiving the trigger signals from the sensing device 30 and for generating the start signals S1 for the power point tracker, as schematically illustrated on FIG. 10.

The trigger signal $T_{PPT}$ generated by the sensing device is for example a voltage signal or a signal based on a current and the first start signal S1 is for example a binary signal, e.g. voltage level high or low.

In embodiments, the controller 40 is configured for delaying the first start signal S1 with respect to the first trigger signal $T_1$ generated by the sensing device 30 by a delay time period $\Delta T$. In this way, an error resulting from transient effects is avoided, i.e. the delay allows the energy source to reach a steady state, and hence avoids the PPT to determine a wrong operating point.

In FIG. 4, an example of an embodiment is shown wherein the start signal S1 is delayed by a time delay period $\Delta T$ with respect to the trigger signal $T_{PPT}$ generated by the sensing device.

In embodiments, the controller 40 is configured for generating a second start signal S2 following generation of the first start signal S1, and wherein the second start signal S2 is generated after a first time period $T_1$ has lapsed since the generation of the first start signal S1. As a response to the second start signal S2, the power point tracker is triggered a second time and repeats the determination of the target voltage. The generation of a first S1 and a successive second S2 start signal is another solution for the transient problem.

In embodiments, as discussed above, the controller is configured for switching from performing second energy harvesting EH-2 to performing first energy harvesting EH-1, if the energy harvesting signal has dropped below a second threshold value. In these embodiments, the controller 40 is configured for generating a third start signal S3 if the second trigger signal $T_2$ is generated, and the power point tracker 20 is configured for starting determining the first target voltage $V_{T1}$ when receiving the third start signal S3.

In embodiments, as discussed above wherein the controller is configured for switching from performing second energy harvesting EH-2 to performing first energy harvesting EH-1 after a pre-defined time period $T_{lap}$ has elapsed without a second generation of the first trigger signal $T_1$, the controller 40 is configured for generating a fourth start signal S4 if the pre-defined time period $T_{lap}$ has elapsed, and wherein the power point tracker is configured for starting determining the target voltage when receiving the fourth start signal S4. This allows the voltage converter to efficiently extract energy if for example there is a continuous ambient low-power energy available, possibly originating from for example another energy source, other than the main ON/OFF energy source. The other energy source can for example be an ambient RF energy source.

In embodiments, the power management device for managing energy from an energy source is implemented as an integrated circuit, i.e. a microchip comprising electronic circuits and a number of input/output pins, also named terminals or connectors or leads. Typically the integrated circuit can have between 12 and 48 terminals.

Figure 2:
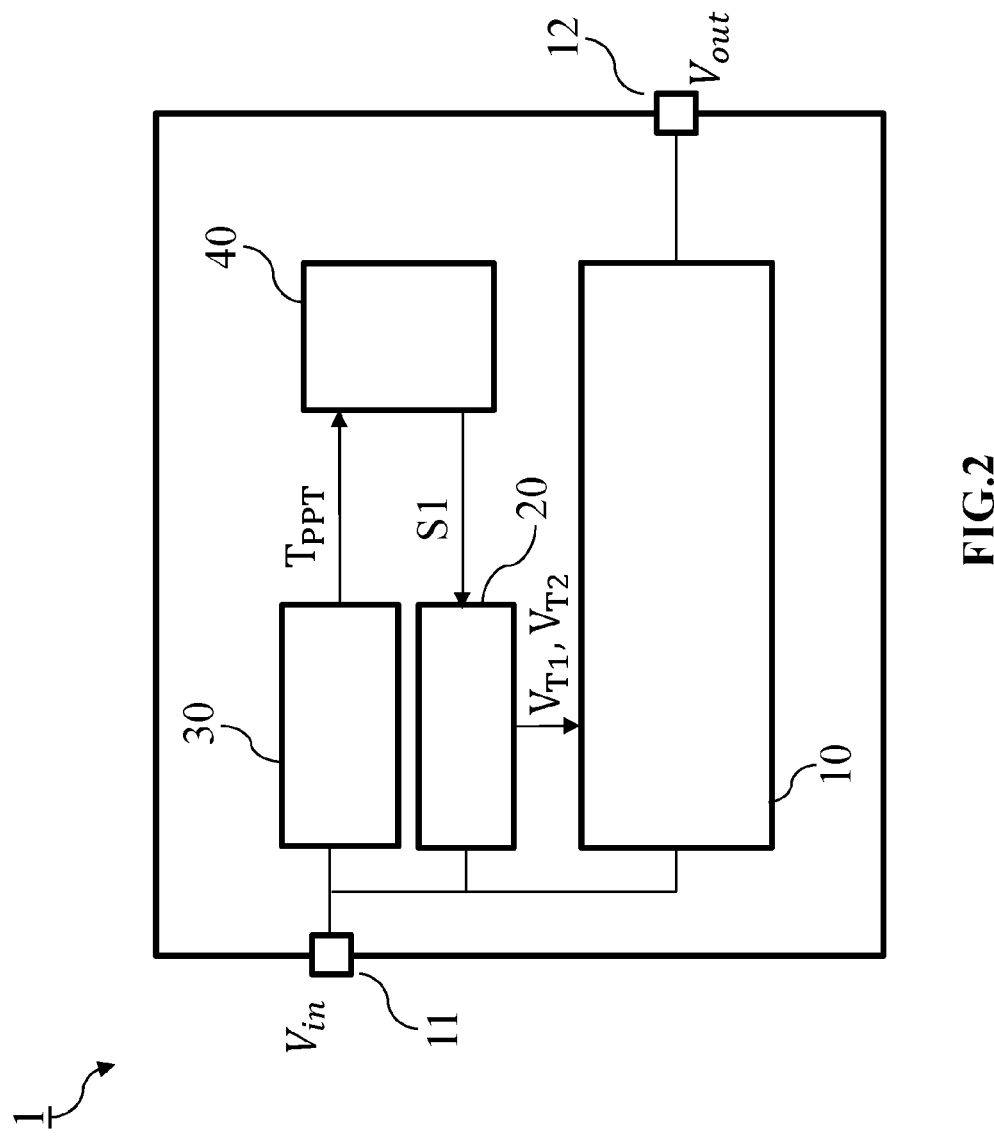
FIG. 2 is a block diagram schematically illustrating a second embodiment of a power management device according to the present disclosure, FIG. 3A schematically illustrates an example of a time diagram illustrating ON and OFF periods of the power point tracker and the voltage converter, FIG. 3B to FIG. 3F schematically show further examples of time diagrams illustrating first EH-1 and second EH-2 energy harvesting periods, FIG. 4 schematically illustrates a further example of a time diagram illustrating ON and OFF periods of the power point tracker and the voltage converter.

In embodiments, as illustrated on FIG. 1 and FIG. 2, wherein the power management device 1, implemented as an integrated circuit, comprises at least a power input terminal 11 for receiving power from the energy source at an input voltage $V_{in}$ nd a power output terminal 12 for outputting power at an output voltage $V_{out}$.

In embodiments, the power management device is further configured for receiving an external trigger signal, and the controller 40 is further configured for starting performing second energy harvesting EH-2 in response to receiving the external trigger signal. For example, if the power management device is receiving the external trigger signal while performing first energy harvesting, the power management device will switch from performing first energy harvesting EH-1 to performing second energy harvesting EH-2. Similarly, if the power management device is receiving the external trigger signal while being in a sleep mode, the power management device will switch from the sleep mode to performing second energy harvesting EH-2.

In embodiments, the power management device comprises a signal detector for detecting the external trigger signal.

In other embodiments, the power management device comprises a trigger input for receiving the external trigger signal.

In embodiments, the external trigger signal is a wireless external trigger signal. In these embodiments, the signal detector comprises for example an antenna.

In embodiments, the controller 40 is configured for generating a further start signal S-EXT for the power point tracker 20 if the external trigger signal has been received, and wherein the power point tracker 20 is configured for receiving the further start signal S-EXT and for starting determining the second target voltage $V_{T2}$ when receiving the further start signal S-EXT.

In embodiments, similar as with the generation of the first trigger signal by the sensing device, also if an external trigger signal is received, the controller 40 is configured for delaying starting operating the power point tracker with respect to the external trigger signal by a delay time period ΔT. Hence in FIG. 4, the four upper panels, namely trigger $T_{PPT}$, start signal, PPT-ON and VC-ON, are also applicable if the trigger signal $T_{PPT}$ is an external trigger signal received by the power management device.

Sensing Device

In embodiments, the sensing device 30 comprises a signal input for receiving the energy harvesting signal. In embodiments wherein the energy harvesting signal is an input voltage, the signal input of the sensing device is electrically connected with the power input terminal 11 of the power management device for sensing the input voltage Vin at the power input terminal 11, as schematically illustrated on FIG. 1 and FIG. 2.

If for instance the input voltage rises above a predefined threshold voltage, this indicates that the energy provided by the energy source has suddenly increased above what can be transferred by the voltage converter 10, e.g. a DC-DC voltage converter, when it regulates at a target voltage level corresponding to low-energy energy harvesting EH1.

In embodiments, the sensing device 30 comprises a signal comparator for comparing the energy harvesting signal with the first threshold value.

The signal comparator can either be an analogue signal comparator or a digital signal comparator, known in the art. A comparator can be based on an operational amplifier. For embodiments wherein a digital signal comparator is used, the generally analogue energy harvesting signal acquired by the sensing device is first digitized using an ADC (analog to digital converter).

The first threshold value can for example be generated by a bandgap reference voltage generator or the first threshold value can be generated by flowing a reference current through a resistor. Alternatively, the threshold value can be communicated through a communication bus.

The sensing device 30 of the present disclosure is not limited to a sensor based on monitoring an input voltage and comparing the input voltage with a threshold. Other implementations of a sensor device for monitoring an energy harvesting signal indicative of harvestable power can be considered.

In embodiments, the sensing device 30 is for example a device configured to monitor the energy being transferred by the voltage converter 10, e.g. a DC-DC voltage converter, over a fixed time reference, for instance from 1 to 250 milliseconds for instance. This can be achieved by for example counting the number of pulses being transferred over that reference time window. If the number of pulses increased above a pre-defined pulse threshold then it means that the power generated by the energy harvester has suddenly increased. Hence, in these embodiments, the energy harvesting signal E corresponds to the number of pulses counted over the fixed time reference.

In some embodiments, the threshold value the energy harvesting signal is compared with can be a dynamically adjustable threshold. For example when the energy harvesting signal E corresponds to the number of pulses counted over the fixed time reference, the pulse threshold could be a function of the input and output voltage, using for example a look up table.

In embodiments wherein the energy harvesting signal E corresponds to the number of pulses counted over the fixed time reference, it is evaluated if the number of pulses has significantly increased, for instance by a factor superior to a factor between 5 and 1000 when compared to a previous counting. Hence, in these embodiments, the threshold corresponds to a previous count number and is hence dynamically adjusted.

Power Point Tracker

In embodiments, the power point tracker 20 comprises a voltage tracking input and the power point tracker is configured for sampling a voltage sensed at the voltage tracking input. Typically, the power point tracker further memorizes the sampled voltage or a percentage of the sampled voltage as the target voltage $V_T$ for regulating the voltage converter. Sampling the input voltage has to be construed as capturing or measuring the input voltage.

In embodiments, the voltage that is tracked at the voltage tracking input is an open circuit voltage and hence the target voltage $V_T$ is then defined as a percentage of the open circuit voltage.

The percentage value depends on the type of energy source, for example if the energy source is a photovoltaic cell, the percentage value is typically a value between 70% and 85% of the open circuit voltage of the energy source. If the energy being harvested is originating from an RF energy source, the percentage is typically set to 50% of the open circuit voltage.

In some embodiments, the power point tracker 20 is configured for using a predefined voltage or a percentage of a predefined voltage as the target voltage $V_T$.

Figure 6:
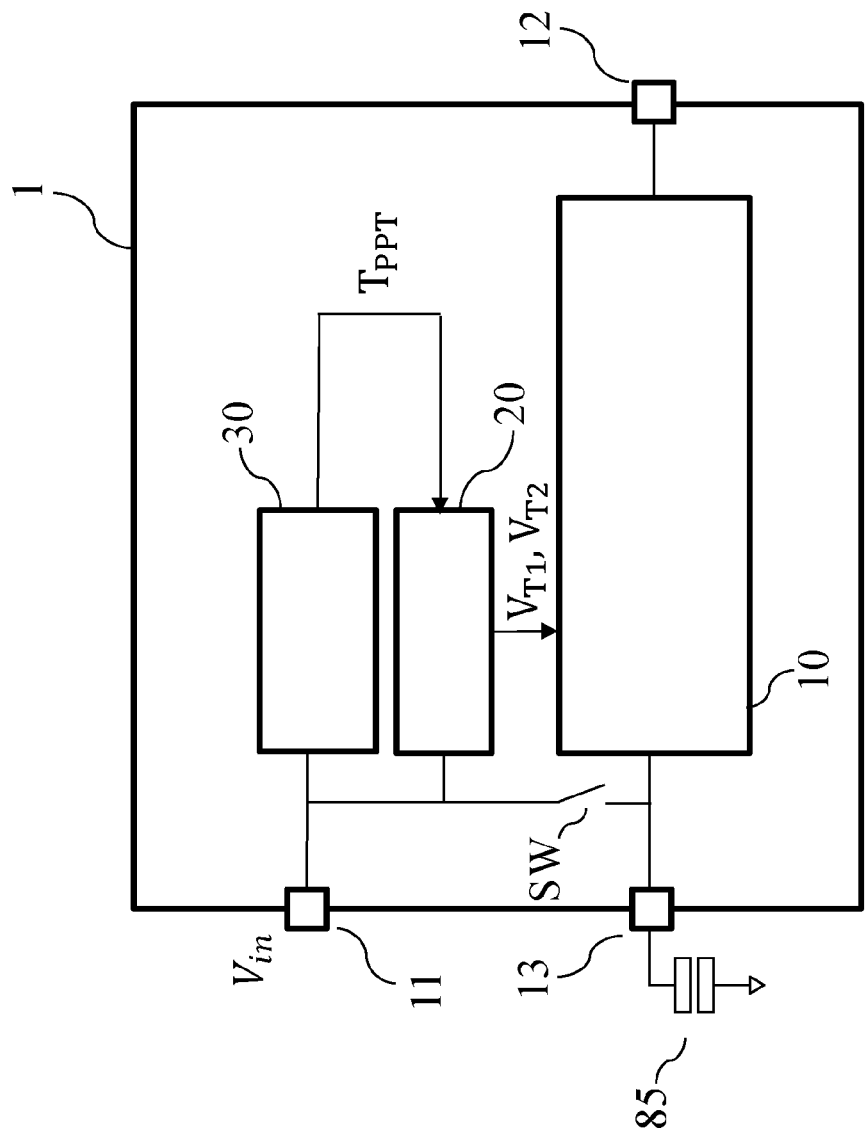
FIG. 6 illustrates a further embodiment of a power management device according to the present disclosure, FIG. 7 schematically illustrates an embodiment of a power point tracker.

In embodiments, as illustrated on FIG. 6, the power management device 1 comprises a buffer capacitor terminal 13 for connecting a buffer capacitor 85. This buffer capacitor terminal 13 is electrically connected with the input terminal 11. The buffer capacitor is charged during operation of the voltage converter when energy is transferred from the energy source to a storage device or a load connected to the power output terminal 12. This buffer capacitor 85 avoids that the input node collapses when the inductor of the voltage converter is building-up current.

In embodiments, as further illustrated on FIG. 6, the power management device comprises a switch SW configured such that when the power point tracker 20 is operable the buffer capacitor terminal 13 is electrically decoupled from the input terminal 11 and when the voltage converter 10 is operable the buffer capacitor terminal 13 is electrically connected with the input terminal 11. In other words, during operation of the power point tracker 30, the switch SW is open and during operation of the voltage converter 10, the switch SW is closed. In this way, when starting operating the power point tracker, transient effects are reduced. The switch SW is generally controlled by the main controller of the power management device.

Figure 7:
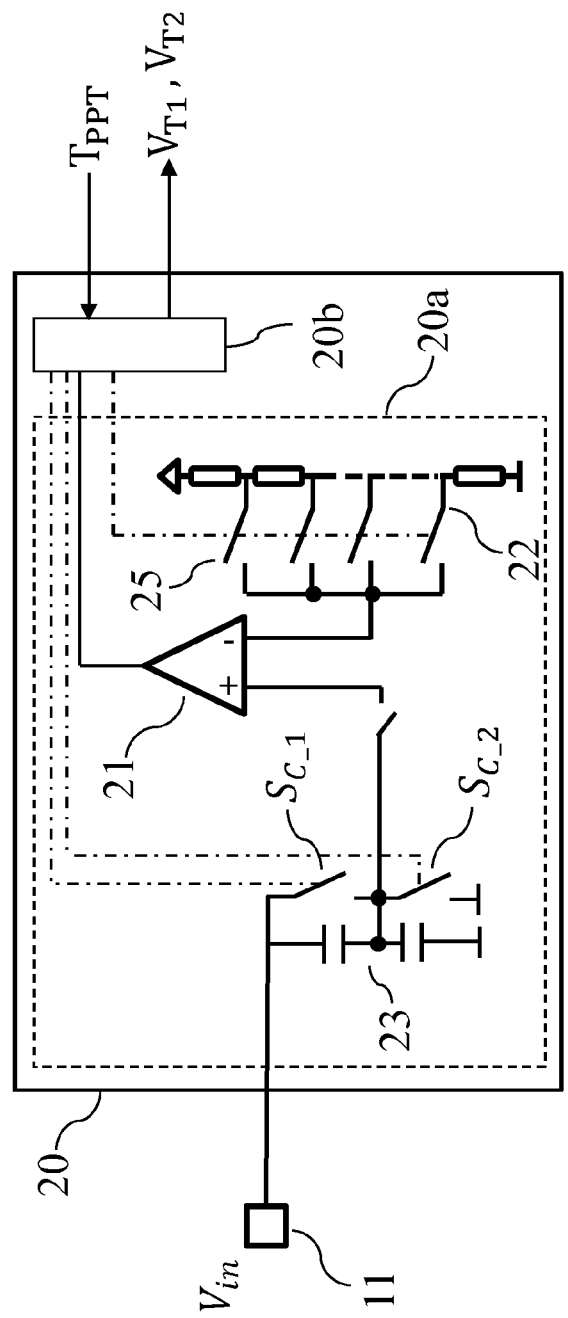

Power point trackers are known in the art and an exemplary embodiment is schematically shown on FIG. 7 wherein the power point tracker 20 is for example, implemented by an analog to digital converter (ADC) based on a successive approximation register (SAR) architecture. As schematically illustrated on FIG. 7 and FIG. 10, the power point tracker 20 typically comprises a PPT electronic circuit 20a and a PPT controller 20b controlling the PPT electronic circuit. In this example, the PPT electronic circuit 20a comprises a resistive ladder 22, a series of switches 25 to select an output of this resistive ladder, a capacitive ladder 23, switches SC_1 and SC_2 to reset this capacitive ladder, and a voltage comparator 21. By closing the switches SC_1 and SC-2 shown on FIG. 7, the capacitive ladder 23 can be discharged. The PPT controller 20b can be a dedicated controller or it can be a controller that is part of a main controller 60, as schematically illustrated on FIG. 10.

When the power point tracker is to be operated following the trigger signal $T_{PPT}$ from the sensing device 30, a number of successive steps are taking place. In a first step, the voltage converter 20 is disabled and the input voltage at the power input terminal stabilizes at the open circuit voltage.

In a second step, a pre-set fraction of the voltage at the power point tracker input is used at the positive input of the voltage comparator 21. The fraction may be at 100% or at a lower fraction value. For example for an open circuit voltage evaluation, the fraction can be set to for example 80% or to for example 50%. The fraction is determined through the use of the capacitive divider 23. If the fraction is 100% the capacitive divider 23 is an optional component.

In a third step, a fraction of a known voltage is used at the negative input of the comparator 21. Different fractions of this known voltage may be selected through the various switches 25 located at different positions of the resistive ladder.

In a fourth step, the PPT controller 20b uses successive approximation to determine the fraction of the known voltage that matches the best with the voltage at the capacitive divider output. Finally, when the best match is found, this matching voltage on the resistive divider becomes the new optimum operational voltage that is used as a target value $V_T$ for regulating the input voltage of the voltage converter. In this way, through the matching settings of the resistive divider, the optimum operational voltage is memorized. Alternatively, the PPT controller can digitally memorize the matching voltage as the optimum operational voltage by acquiring the successive comparator output values.

In embodiments, the power point tracker is configurable for defining two or more values for the percentage of the sampled voltage. In embodiments, the power management device comprises for example a configuration terminal coupled with the power point tracker 20 to provide a configuration signal to the power point tracker that allows to define what fraction or what percentage of the voltage $V_{in}$ sensed at the power input terminal during needs to be taken as the optimum operational voltage. The configuration signal can for example have three defined levels indicating if the power point tracker needs to take 50%, 80% or 100% of the open circuit voltage. The configuration signal can consist of multiple signals, e.g. a bus signal to transfer configuration information.

In an alternative embodiment, the PPT does not comprise a capacitive divider and in step 2 the open circuit voltage is measured, and in step 4 the PPT controller takes a fraction of the matching voltage as the target voltage.

In embodiments, the fraction to be taken of the open circuit voltage is hardcoded, while in other embodiments, a configuration signal is transferred to the power point tracker that allows to define what fraction or what percentage of the open circuit voltage needs to be taken as the optimum operational voltage. The configuration signal can for example have four defined levels indicating if the power point tracker needs to take for example 50%, 70%, 80% or 100% of the open circuit voltage. The configuration signal can consist of multiple signals, e.g. a bus signal to transfer configuration information. In some embodiments, the PMIC comprises more than one configuration terminal to provide configuration signals or bus signals.

Sleep Mode and Reset Mode

In embodiments, the controller 40 is configured for switching the power management device between an energy harvesting mode EH-M and a sleep mode SLP-M of reduced power consumption. The first EH-1 and the second EH-2 energy harvesting is performed when in the energy harvesting mode. The energy harvesting mode can also be named the active mode.

In embodiments, as schematically illustrated on FIG. 3d to FIG. 3f, the sensing device 30 is configured for generating a third trigger signal $T_3$ if the energy harvesting signal E has dropped from a value above to a value below a third threshold value $E_{T3}$, and wherein the third threshold value is lower than the first threshold value $E_{T1}$. In these embodiments the controller 40 is configured for generating a sleep signal SLP for switching the power management device 1 from the energy harvesting mode EH-M to the sleep mode SLP-M of reduced power consumption if the third trigger signal $T_3$ is generated.

In this way, by switching from the energy harvesting mode EH-M to the sleep mode SLP-M, when the power management device is not active for harvesting energy, the power consumption is reduced. In embodiments, during the sleep mode, the clock frequency is reduced and generally part of the voltage converter is OFF to reduce the PMIC quiescent current.

In embodiments, as further illustrated on FIG. 3d to FIG. 3f, the sensing device 30 is configured for generating a fourth trigger signal $T_4$ if the energy harvesting signal E has increased from a value below to a value above the third threshold value $E_{T3}$. In these embodiments, the controller 40 is configured for switching from the sleep mode SLP-M to the energy harvesting mode EH-M if the fourth trigger signal $T_4$ is generated. In the embodiments shown on FIG. 3d and FIG. 3e, there is switch from the sleep mode SLP-M to the first energy harvesting mode EH-1.

Figure 3F:
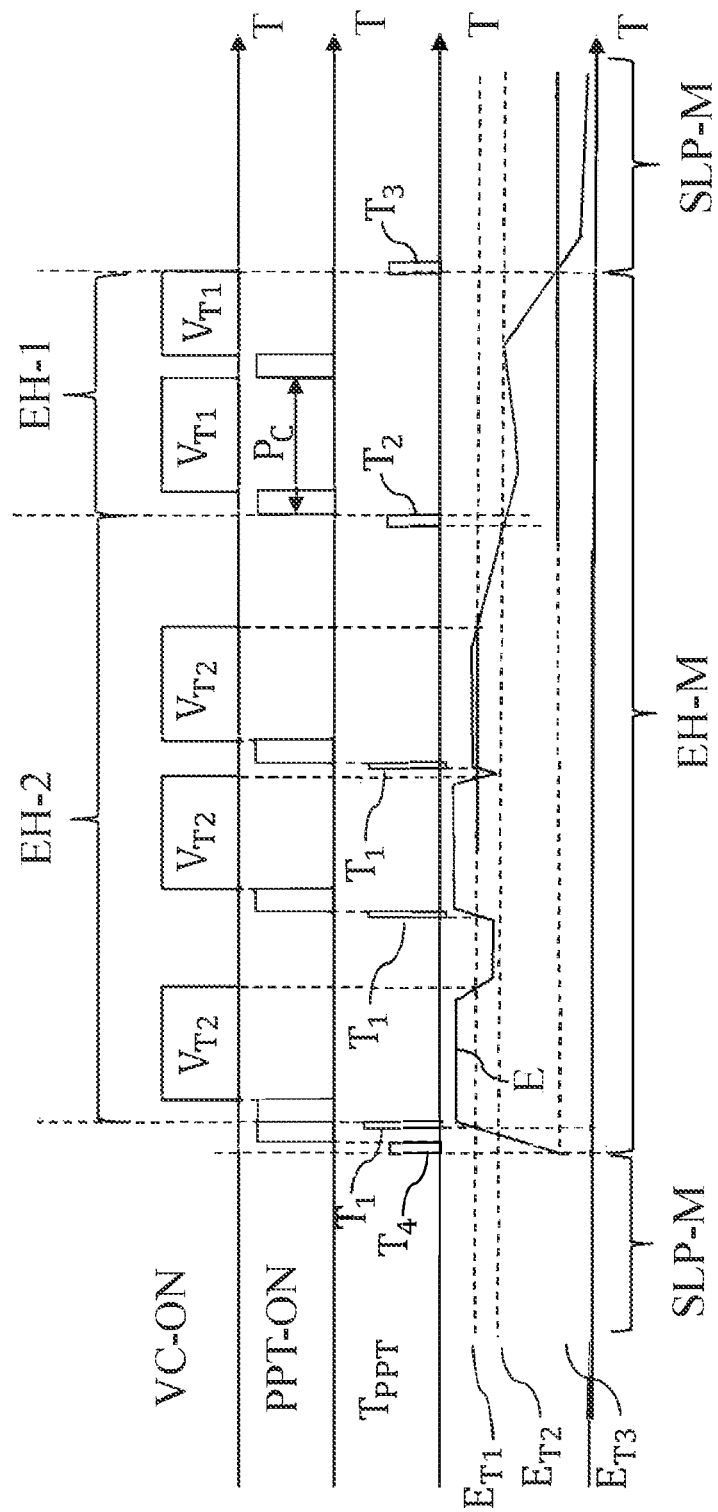

For the specific case, schematically illustrated on FIG. 3f, wherein, when in the sleep mode SLP-M, the energy harvesting signal E is increasing fast, initially the fourth trigger signal $T_4$ is generated when raising above the third threshold value $E_{T3}$, followed by a generation of a first trigger signal $T_1$ when further raising above the first threshold value $E_{T1}$. Thereafter the voltage converter is operational and starts energy harvesting and regulating the input voltage at the second target voltage $V_{T2}$. Hence, in this example there is switch from the sleep mode SLP-M, directly to performing second energy harvesting EH-2. Even if in response to the the fourth trigger signal $T_4$, the power point tracker would have started a determination of the first target voltage $V_{T1}$, this determination of the first target voltage is interrupted by the first trigger signal $T_1$, and a new determination of the target voltage is started, as schematically illustrated on FIG. 3f.

In further embodiments, the controller 40 is configured for resetting the power management power management device 1 if a reset time period $\Delta T_R$ has elapsed without receiving the trigger signal from the sensing device. The reset mode is a mode wherein the power management device is OFF and no power is consumed.

Figure 5:
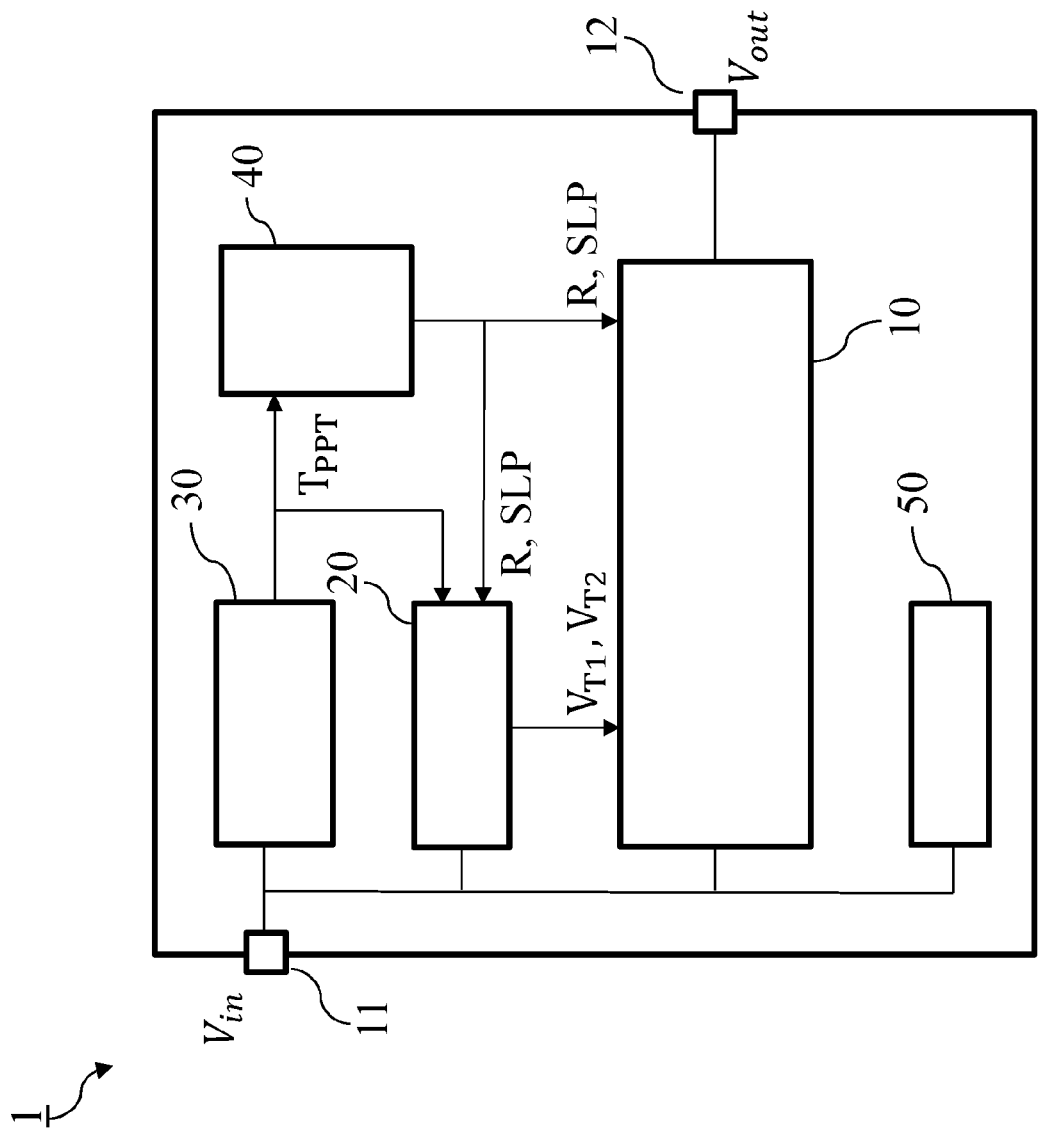
FIG. 5 is a block diagram schematically illustrating a third embodiment of a power management device according to the present disclosure.

In FIG. 5, an embodiment of an power management device is shown wherein the controller 40 is outputting a reset signal R to the voltage converter 10 and to the power point tracker 20 if no trigger signal $T_{PPT}$ was generated by the sensing device 30 during a period longer than a predefined reset time period $\Delta T_R$.

In embodiments, the power management device comprises a cold-start circuit 50 for starting the circuit after a reset.

The cold-start circuit 50 is a start-up circuit for acquiring energy from the energy source and for powering the power management device 1. Generally, the voltage converter 10 is not operable when no sufficient supply power is available to power the controllers of the PMIC. Indeed, for example the voltage converter controller is only operable if a supply voltage V sup at a supply input of the controller is equal or above a minimum required supply voltage. When sufficient supply voltage becomes available to operate the controller, the cold-start energy harvesting is stopped and thereafter the power management device sequentially operates the power point tracker and the voltage converter based on the trigger signal received from the sensing device, as discussed above.

Voltage Converter

The power management device 1 according to the present disclosure comprises at least one voltage converter 10. Typically, the voltage converter 10 comprises a voltage converter electronic circuit 10a and a voltage converter controller 10b for controlling the voltage converter electronic circuit.

As discussed above, in embodiments, the voltage converter can for example be a boost converter circuit for increasing the input voltage $V_{in}$, a buck converter circuit for decreasing the input voltage $V_{in}$ or a buck-boost converter circuit for both decreasing and increasing the input voltage.

Figure 11:
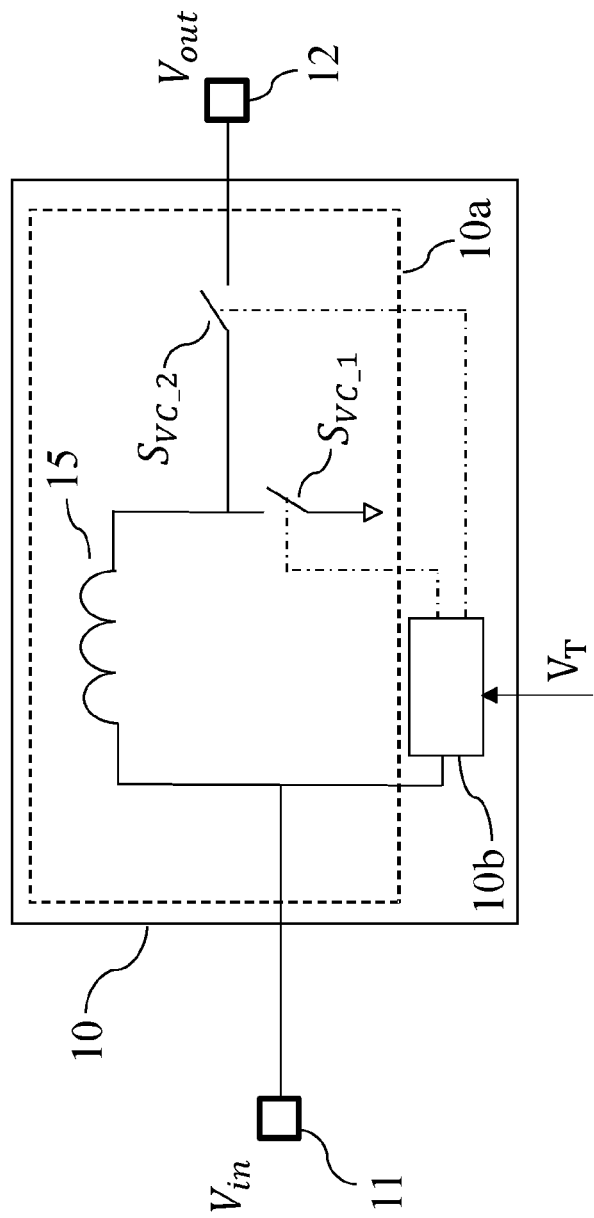

An example of a boost converter circuit is schematically illustrated on FIG. 11. Typically, the voltage converter electronic circuit 10a comprises an inductor 15 and a first SVC_1 and second switch SVC_2 that are controlled by the voltage converter controller 10b. In embodiments, the voltage converter controller 10b can be part of a main controller 60 of the power management device, as schematically illustrated on FIG. 10. As shown on FIG. 11, when a boost converter is used, the inductor 15 is placed in series with the power input terminal 11. As known in the art, by cyclically controlling the first SVC_1 and second SVC_2 switch, magnetic energy stored in the inductor 15 is cyclically transferred to for example a load or battery connected to the voltage converter output 12 that is at a higher output voltage $V_{out}$ than the voltage at the converter input $V_{in}$.

In embodiments, instead of using a inductive voltage converter as discussed above, a switched-capacitor converter is used. Switched capacitors converters are known in the art and these converters deliver power by charging and discharging capacitors.

When extracting power from the energy source, the voltage converter is continuously regulating the input voltage $V_{in}$ by using as target voltage $V_T$ the last value defined and memorized by the power point tracker as optimum operational voltage.

In embodiments, the last target voltage memorized can be the target voltage determined by the power point tracker following the trigger signal generated by the sensing device. However, for some embodiments, the last target voltage memorized is not necessarily the target voltage determined following the trigger signal of the sensing device. This is the case when the power point tracker is additionally triggered by another signal, other than the trigger signal from the sensing device. For example, as discussed above, in embodiments the controller 40 generates a second start signal S2 following generation of the first start signal S1, and as a response to the second start signal S2, the power point tracker is triggered a second time and repeats the determination of the target voltage, and the second value determined becomes the last value defined and memorized. In other embodiments, after the first triggering of the PPT by the trigger signal from the sensing device, the PPT can further repetitively be triggered by for example an internal clock generator.

In embodiments, the voltage converter controller 10b comprises a sensor for sensing the input voltage $V_{in}$ of the voltage converter and a comparator or amplifier for comparing the input voltage with the target voltage $V_T$ determined by the power point tracker. When the voltage at the converter input falls below the target value, the voltage converter is disabled, preventing the voltage at the converter input to lower further. On the other hand, when the voltage at the voltage converter input rises above the target value, power transfer from the converter input to its output is enabled. In this way, the input voltage is regulated to stay close to the target voltage.

In some embodiments wherein the power management device is implemented as an IC, the inductor 15 is located outside the IC and additional terminals are provided to couple the inductor to the IC.

By leaving the first SVC_1 and second SVC_2 switch of the voltage converter open, the voltage converter is disabled. This prevents power from being extracted by the voltage converter. The voltage converter is for example disabled during operation of the power point tracker.

In embodiments, as illustrated on FIG. 4, the voltage converter is ON during a fixed pre-defined time period $\Delta T_{VC\_ON}$. For example, if the energy source is a repetitive ON/OFF energy source, the pre-defined time period $\Delta T_{VC\_ON}$ can be selected to correspond to the time period the ON/OFF energy source is expected to be ON.

In other embodiments, as illustrated on FIG. 3a, the voltage converter is ON until the energy harvesting signal drops below a further threshold value, which can be the same or a different threshold value from the first threshold value $E_T$ used to trigger the trigger signal $T_{PPT}$. In embodiments, the further threshold value is lower than the first threshold value. In other embodiments, as illustrated on FIG. 3a, the first and further threshold value are equal. In embodiments, the further threshold value is higher than the first threshold value.

Energy Harvesting System

Figure 8:
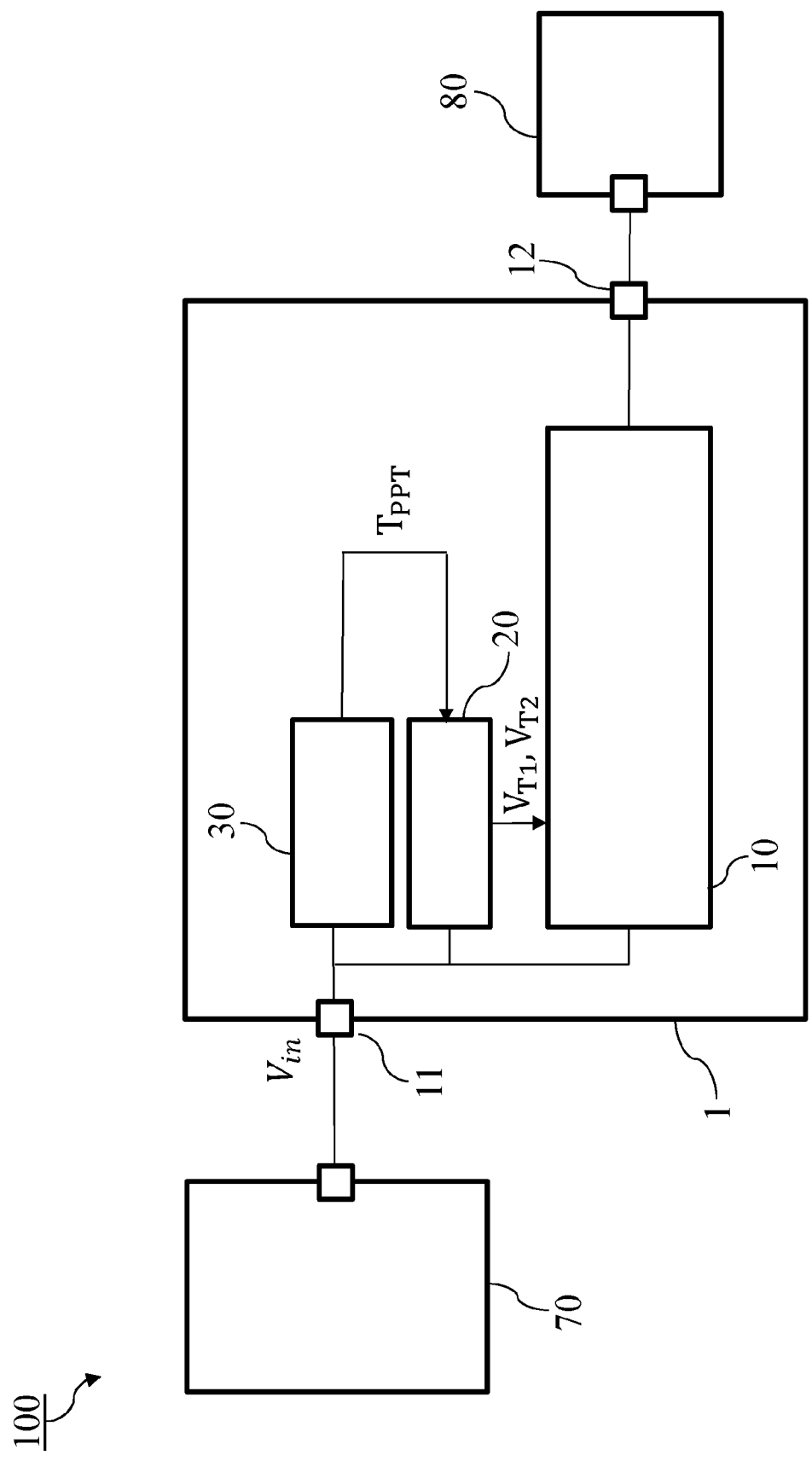
FIG. 8 is illustrating an example of an energy harvesting system according to the present disclosure.

In FIG. 8, an example of an energy harvesting system 100 comprising an power management device 1 according to the present disclosure is schematically shown.

In the embodiment shown on FIG. 8 an energy source 70 is coupled to the power input terminal 11 of the power management device and a rechargeable storage device 80 is coupled to the power output terminal 12. In other embodiments, a load is coupled to the power output terminal 12. The energy source is for example an intermittent energy source.

Figure 9:
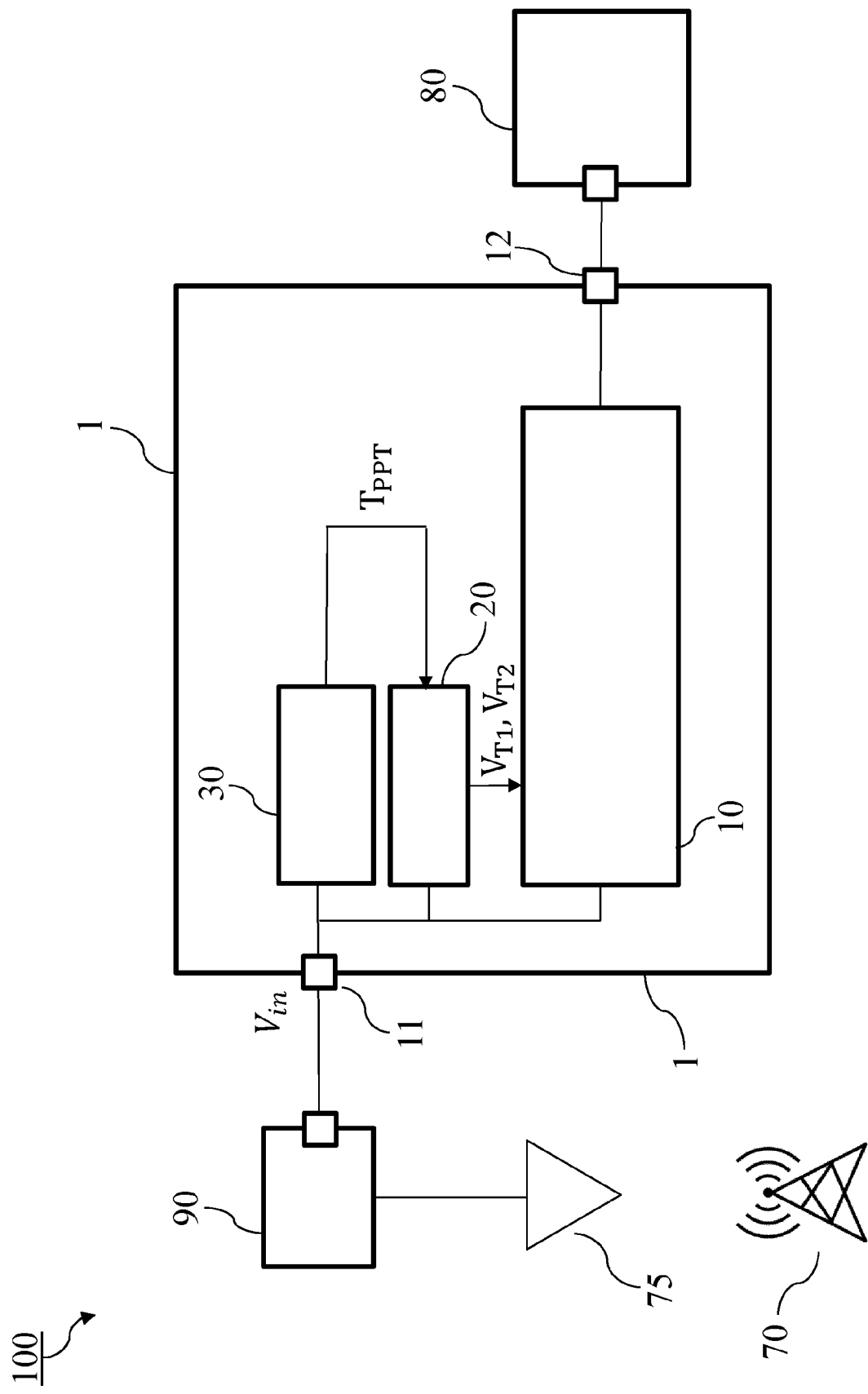
FIG. 9 illustrates an example of an energy harvesting system wherein the energy source is an RF energy source.
Figure 10:
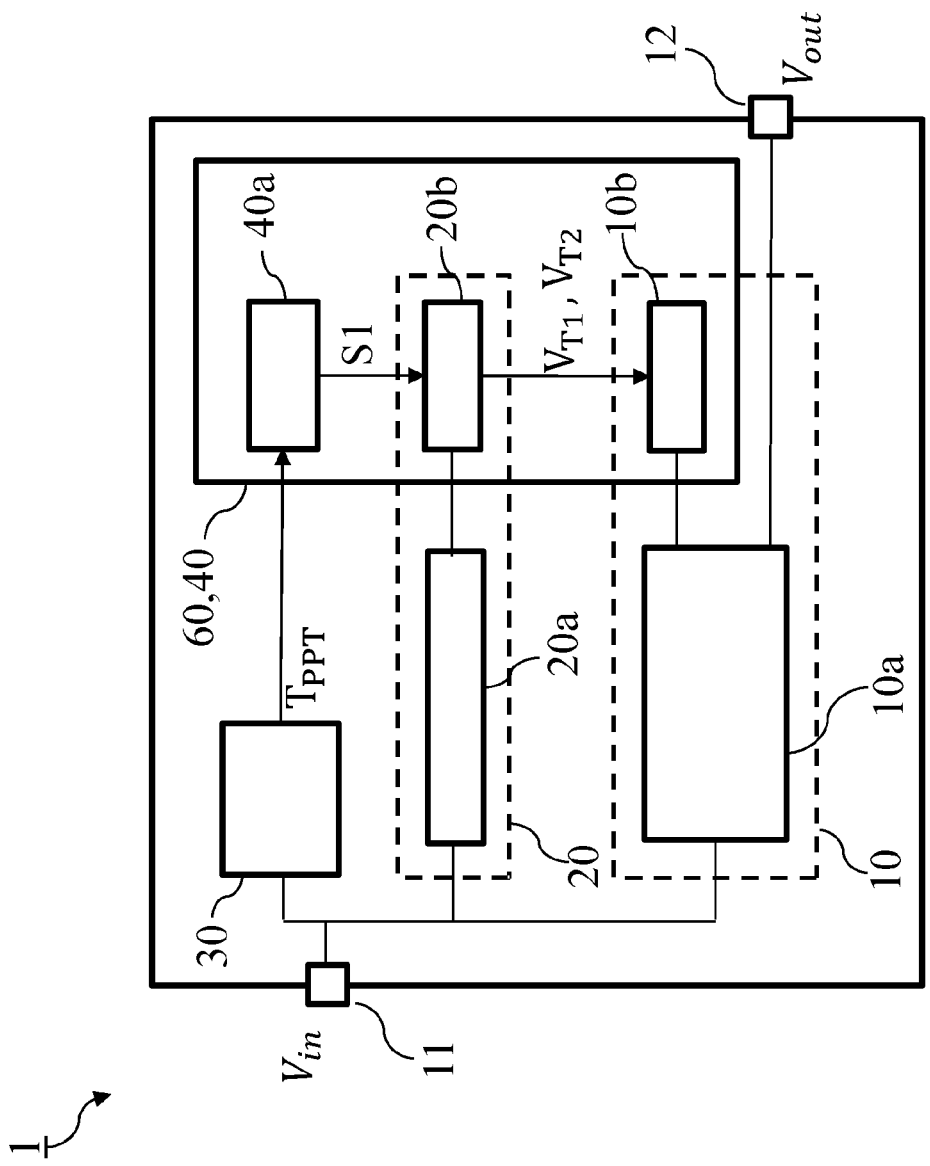
FIG. 10 is a block diagram schematically illustrating a fourth embodiment of a power management device according to the present disclosure, FIG. 11 schematically illustrates an example of an embodiment of a voltage converter.

With reference to FIG. 9, a further embodiment of an energy harvesting system 100 comprising an power management device 1 according to the present disclosure is schematically shown. In this example, the energy source is an RF source 70. In this embodiment, the system 100 comprises an antenna 75 for capturing RF energy from the RF source 70 and further comprises a rectifier 90 and wherein an output of the rectifier is coupled to the power input terminal 11 of the power management device 1.

In FIG. 8 and FIG. 9, the controller 40 for controlling operation of the power point tracker and voltage converter is not shown. As discussed above the controller 40 can correspond to the main controller 60 of the power management device or the controller 40 can be a sub-controller of the main controller 60 of the power management device.

Method for Managing Energy from an Energy Source

The present disclosure is also related to a method for managing energy from an energy source using a power management device that comprises i) a voltage converter 10 configured for regulating an input voltage at a target voltage $V_T$ and ii) a power point tracker 20 configured for determining the target voltage $V_T$ as an optimum operational voltage for extracting power from the energy source.

The method for managing energy from an energy source comprises the steps of:
monitoring an energy harvesting E that is indicative of a presence of energy from the energy source,
comparing the energy harvesting signal E with a first threshold value $E_{T1}$, generating a first trigger signal $T_{PPT}$, $T_1$ if the energy harvesting signal is increasing from a value below to a value above the first threshold value $E_{T1}$,
as long as the first trigger signal $T_{PPT}$, $T_1$ is not generated performing first energy harvesting EH-1, wherein the first energy harvesting comprises:
a) cyclically operating the power point tracker 20 for determining a first target voltage $V_{T1}$, and
b) operating and regulating the voltage converter 10 at the first target voltage $V_{T1}$,
if the first trigger signal $T_{PPT}$, $T_1$ is generated then switching from performing first energy harvesting EH-1 to performing second energy harvesting EH-2, wherein the second energy harvesting comprises:
a) starting operating the power point tracker 20 and determining a second target voltage $V_{T2}$ with the power point tracker 20 in response to the generation of the first trigger signal $T_{PPT}$, and
b) starting operating and regulating the voltage converter 10 at the second target voltage $V_{T2}$ if the power point tracker has completed determining the second target voltage $V_{T2}$.

In embodiments, the method further comprises:
generating a second trigger signal $T_2$ if the energy harvesting signal E has dropped from a value above the first threshold value $E_{T1}$ to a value below a second threshold value $E_{T2}$, and wherein the second threshold value $E_{T2}$ is equal or lower than the first threshold value $E_{T1}$,
switching from performing the second energy harvesting to performing the first energy harvesting if the second trigger signal $T_2$ is generated.

In embodiments, the method comprises:
after having performed the determination of the second target voltage $V_{T2}$ for a first time in response to the generation of the first trigger signal $T_1$, cyclically operating the power point tracker 20 for cyclically repeating the determination of the second target voltage $V_{T2}$.

In embodiments, the switching from performing the second energy harvesting EH-2 to performing the first energy harvesting EH-1 if the second trigger signal $T_2$ has been generated is executed only at a moment in time when the power point tracker is operational for target voltage determination. In other words, the switching from the first to the second energy harvesting is not executed while the voltage converter is operational but only when a cyclic operation of the power point tracker has started or is ongoing.

In embodiments, the method comprises:
after having performed the determination of the second target voltage ($V_{T2}$) for a first time in response to the generation of the first trigger signal ($T_1$), cyclically operating the power point tracker (20) for cyclically repeating the determination of the second target voltage ($V_{T2}$),
comparing each second target voltage ($V_{T2}$) determined with a target threshold value, and
switching from performing the second energy harvesting (EH-2) to performing the first energy harvesting (EH-1) if during operation of the power tracker the second target voltage determined is below the target threshold value.

In other embodiments, the method comprises:
switching from performing the second energy harvesting to performing the first energy harvesting if following a first generation of the first trigger signal $T_1$, a pre-defined time period $T_{lap}$ has elapsed without a second generation of the first trigger signal $T_1$.

In embodiments, the method comprises:
switching to a sleep mode of reduced power consumption if the energy harvesting signal E has dropped from a value above to a value below a third threshold value $E_{T3}$, and wherein the third threshold value $E_{T3}$, is lower than the first threshold value $E_{T1}$.

In embodiments, the method comprises:
receiving an external trigger signal, and starting performing second energy harvesting EH-2 if the external trigger signal has been received.

In embodiments, the step of starting determining the first target voltage $V_T$ with the power point tracker 20 in response to the generation of the first trigger signal $T_1$, $T_{PPT}$ with the power point tracker, is performed within less than 250 ms, preferably within less than 10 ms, more preferably within less than 1 ms.

In embodiments, before starting operating the voltage converter, the power point tracker is disabled, in other words, the power management device is configured for operating the power point tracker 20 and operating the voltage converter 10 in a mutually exclusive way.

The invention claimed is:

1. A power management device (1) for managing energy from an energy source, comprising
a voltage converter (10) configured for regulating an input voltage of the voltage converter at a target voltage ($V_T$),
a power point tracker (20) configured for determining said target voltage ($V_T$) as an optimum operational voltage for extracting power from the energy source,
a controller (40) for controlling operation of said voltage converter (10) and said power point tracker (20)
said power management device (1) comprising
a sensing device (30) configured for
i) monitoring an energy harvesting signal (E), and wherein said energy harvesting signal is indicative of harvestable power from an energy source, and
ii) comparing the energy harvesting signal (E) with a first threshold value ($E_T$, $E_{T1}$),
iii) if the energy harvesting signal has increased from a value below to a value above said first threshold value ($E_T$,$E_{T1}$) then generating a first trigger signal ($T_{PPT}$, $T_1$),
said controller (40) being configured for:
i) performing first energy harvesting (EH-1) as long as said sensing device (30) has not generated said first trigger signal ($T_{PPT}$, $T_1$), and wherein performing first energy harvesting comprises:
a) cyclically operating the power point tracker (20) for determining a first target voltage ($V_{T1}$), and
b) operating and regulating the voltage converter (10) at the first target voltage ($V_{T1}$), and
ii) switching from performing first energy harvesting (EH-1) to performing second energy harvesting (EH-2) if the sensing device is generating said first trigger signal ($T_1$), and wherein performing second energy harvesting comprises:
a) operating the power point tracker (20) and determining a second target voltage ($V_{T2}$) in response to the generation of the first trigger signal ($T_{PPT}$, $T_1$) by the sensing device (30), and
b) operating and regulating the voltage converter at said second target voltage ($V_{T2}$) if the power point tracker has completed determining the second target voltage ($V_{T2}$)
wherein said sensing device (30) comprises a signal output for outputting said first trigger signal ($T_{PPT}$, $T_1$) and wherein said signal output of the sensing device (30) is electrically connected with a signal input of said power point tracker (20), and wherein the power point tracker (20) is configured for starting a first determination of said second target voltage ($V_{T2}$) when receiving said first trigger signal ($T_{PPT}$, $T_1$).

2. The power management device according to claim 1 wherein said sensing device (30) comprises a signal output for outputting said first trigger signal ($T_{PPT}$).

3. The power management according to claim 1 wherein the controller (40) is configured for generating a first start signal (S1) for the power point tracker (20) if said first trigger signal ($T_1$) is generated, and wherein said power point tracker (20) is configured for receiving said first start signal (S1) and for starting a first determination of said second target voltage ($V_{T2}$) when receiving said first start signal (S1).

4. The power management device according to claim 3 wherein said controller (40) is configured for delaying said first start signal (S1) with respect to said first trigger signal ($T_{PPT}$, $T_1$) generated by the sensing device (30) by a delay time period ($\Delta T$).

5. The power management device according to claim 3 wherein the controller (40) is configured for generating a second start signal (S2) after a first time period ($T_1$) has lapsed since the generation of the first start signal (S1), and wherein the power point tracker (20) is configured for starting a second determination of the second target voltage ($V_{T2}$) when receiving the second start signal (S2).

6. The power management device of claim 1
wherein said sensing device (30) is configured for generating a second trigger signal ($T_2$) if the energy harvesting signal (E) has dropped from the value above the first threshold value ($E_{T1}$) to a value below a second threshold value ($E_{T2}$), and wherein the second threshold value is equal or lower than the first threshold value,
and wherein said controller (40) is further configured for
iii) switching from performing said second energy harvesting (EH-2) to performing said first energy harvesting (EH-1) if the sensing device (30) has generated said second trigger signal ($T_2$).

7. The power management device of claim 1 wherein said controller (40) is further configured for
iii) switching from performing said second energy harvesting (EH-2) to performing said first energy harvesting (EH-1) if following a first generation of said first trigger signal ($T_1$) a pre-defined time period ($T_{lap}$) has elapsed without a second generation of said first trigger signal ($T_1$).

8. The power management device according to claim 1 wherein said performing second energy harvesting (EH-2) further comprises:
c) after having performed the determination of the second target voltage ($V_{T2}$) for a first time in response to the generation of the first trigger signal ($T_1$) by the sensing device (30), cyclically operating the power point tracker (20) for cyclically repeating the determination of the second target voltage ($V_{T2}$).

9. The power management device according to claim 1 wherein
said performing second energy harvesting (EH-2) further comprises:
c) after having performed the determination of the second target voltage ($V_{T2}$) for a first time in response to the generation of the first trigger signal ($T_1$) by the sensing device (30) cyclically operating the power point tracker (20) for cyclically repeating the determination of the second target voltage ($V_{T2}$),
d) comparing each second target voltage ($V_{T2}$) determined with a target threshold value, and wherein said controller (40) is further configured for iii) switching from performing said second energy harvesting (EH-2) to performing said first energy harvesting (EH-1) if during operation of the power tracker the second target voltage determined is below said target threshold value.

10. The power management device according to claim 1 wherein said sensing device (30) is configured for generating a third trigger signal ($T_3$) if the energy harvesting signal (E) has dropped from a value above to a value below a third threshold value ($E_{T3}$), and wherein the third threshold value is lower than the first threshold value, and wherein said controller (40) is configured for switching the power management device between an energy harvesting mode (EH-M) and a sleep mode (SLP-M) of reduced power consumption, and wherein said first and said second energy harvesting is performed when in said energy harvesting mode, and wherein the controller (40) is configured for generating a sleep signal (SLP) for switching the power management device (1) from the energy harvesting mode (EH-M) to the sleep mode (SLP-M) of reduced power consumption if said third trigger signal ($T_3$) is generated.

11. The power management device according to claim 1 wherein the sensing device (30) comprises a comparator for comparing the energy harvesting signal with said first threshold value.

12. The power management device according to claim 1 wherein said sensing device (30) is configured to monitor the energy being transferred by the voltage converter (10) over a fixed time reference by counting a number of energy pulses being transferred over that reference time window, and wherein the number of pulses counted over the fixed time reference correspond to said energy harvesting signal (E).

13. The power management device according to claim 1 wherein the voltage converter (10) is configured for starting operation if the determination of the target voltage ($V_{T1}$, $V_{T2}$) by the power point tracker (20) is completed.

14. The power management device according to claim 1 wherein operating and regulating the voltage converter (10) at said second target voltage ($V_{T2}$) is performed during a fixed time period ($\Delta T_{VC\text{-}ON}$).

15. The power management device according to claim 1 wherein operating and regulating the voltage converter (10) at said second target voltage ($V_{T2}$) is performed until the sensing device (30) detects that the energy harvesting signal has dropped below a further threshold value, and wherein the further threshold value is equal or lower than the first threshold value ($E_{T1}$).

16. The power management device according to claim 1 wherein the power management device is further configured for receiving an external trigger signal, and wherein said controller (40) is further configured for starting performing second energy harvesting (EH-2) if said external trigger signal has been received.

17. The power management device according to claim 1 further comprising:

a power input terminal (11) for receiving energy from an energy source, a buffer capacitor terminal (13) for connecting a buffer capacitor, a switch (SW) configured such that when the switch is open or closed the buffer capacitor terminal (13) is respectively electrically decoupled from the power input terminal (11) or electrically coupled with the power input terminal (11), and wherein the power management device is configured for maintaining said switch (SW1) open when the power point tracker (20) is operable and for maintaining said switch (SW1) closed when the voltage converter (10) is operable.

18. The power management device according to claim 1 wherein said power point tracker (20) comprises a voltage tracking input and wherein the power point tracker is configured for sampling a voltage sensed at the voltage tracking input and for memorizing the sampled voltage or a percentage of the sampled voltage as the target voltage.

19. The power management device according to claim 1 wherein the power management device (1) is configured for operating the power point tracker (20) and operating the voltage converter (10) in a mutually exclusive way.

20. The power management device according to claim 1 wherein said starting operating the power point tracker (20) and determining the second target voltage ($V_{T2}$) in response to the generation of the first trigger signal ($T_{PPT}$) by the sensing device (30) is performed within less than 250 ms following the generation of the first trigger signal ($T_1$).

* * * * *